Figure 8:
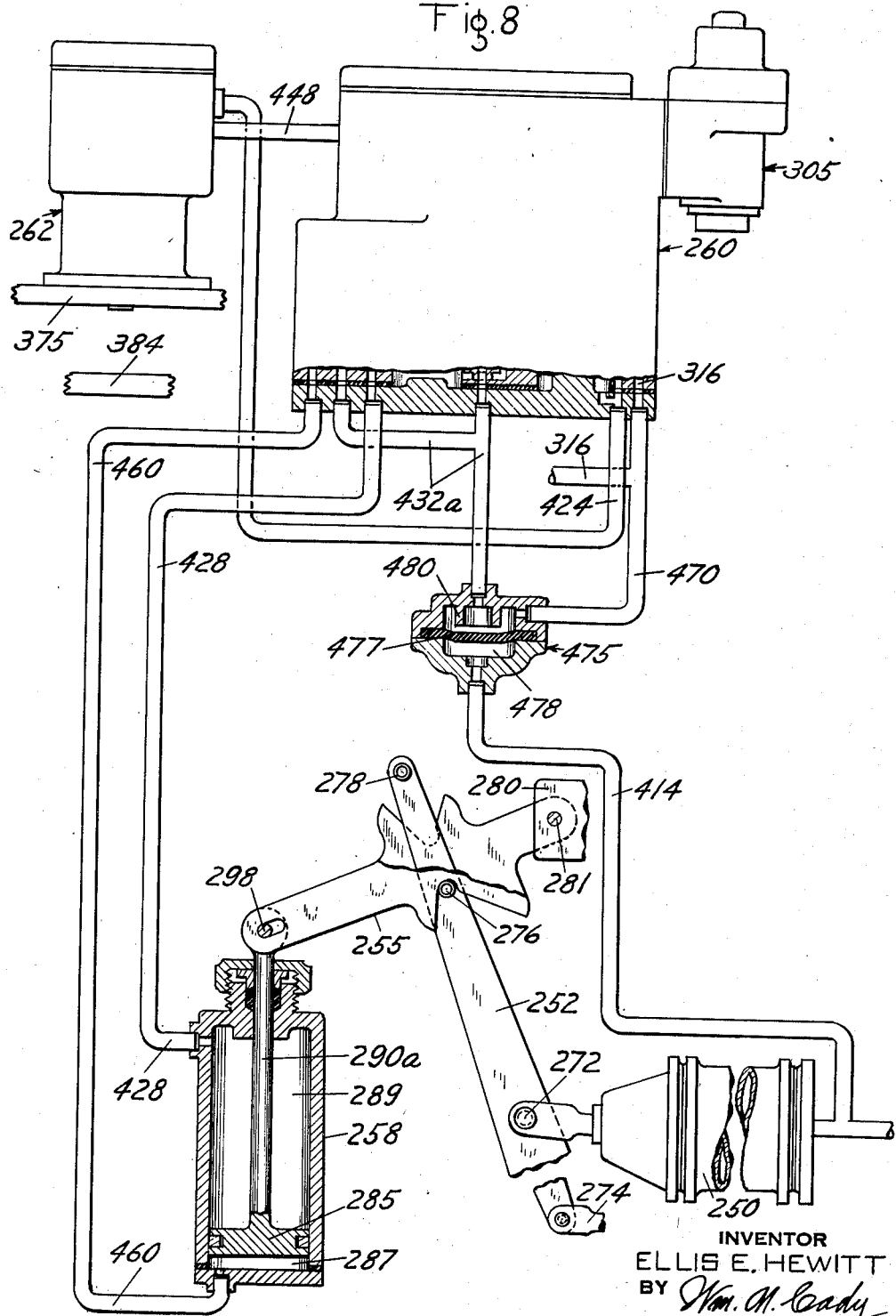

March 26, 1940.  E. E. HEWITT  2,194,751
EMPTY AND LOAD BRAKE DEVICE
Filed Nov. 27, 1935  4 Sheets-Sheet 1
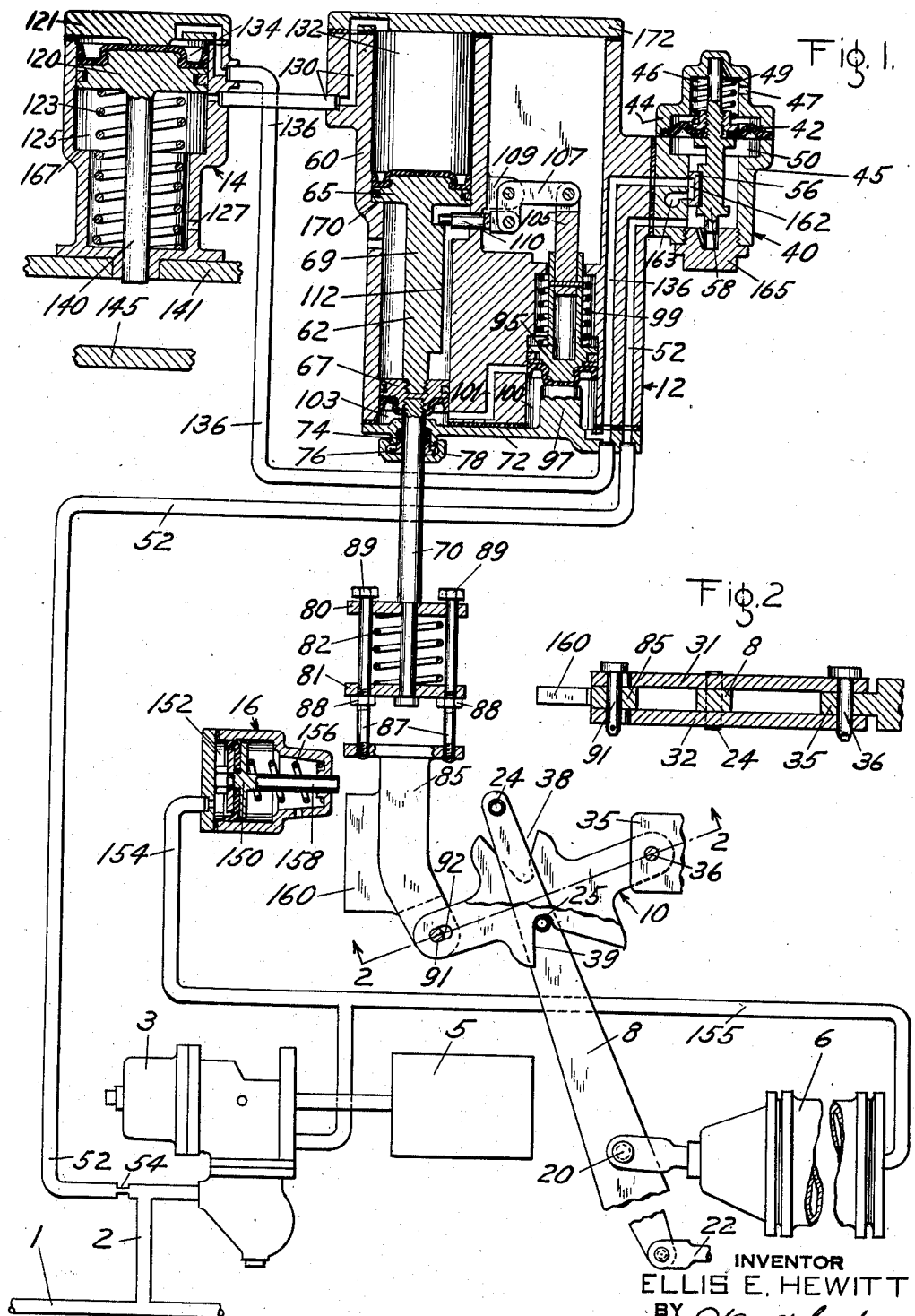
INVENTOR
ELLIS E. HEWITT
BY
ATTORNEY

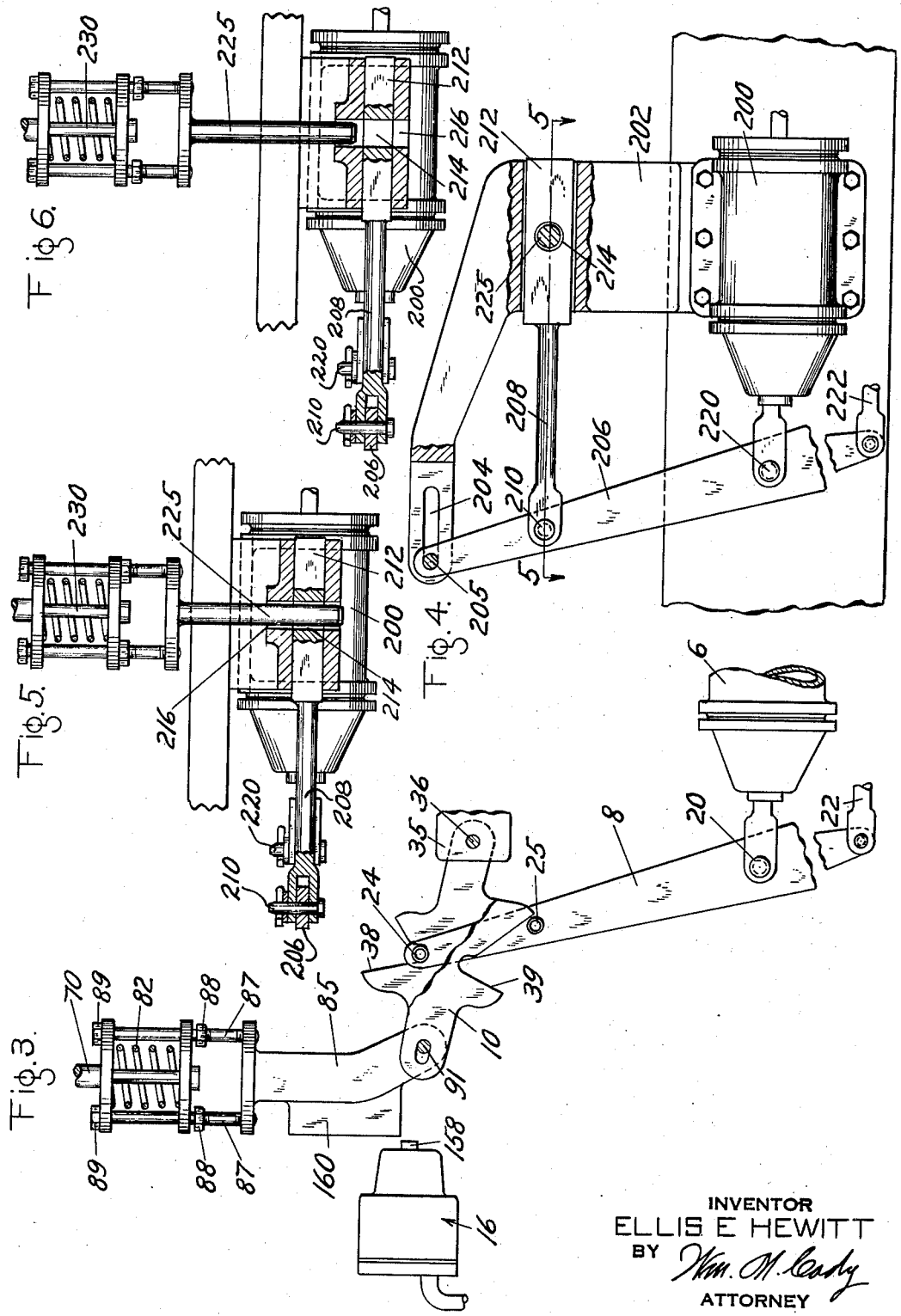

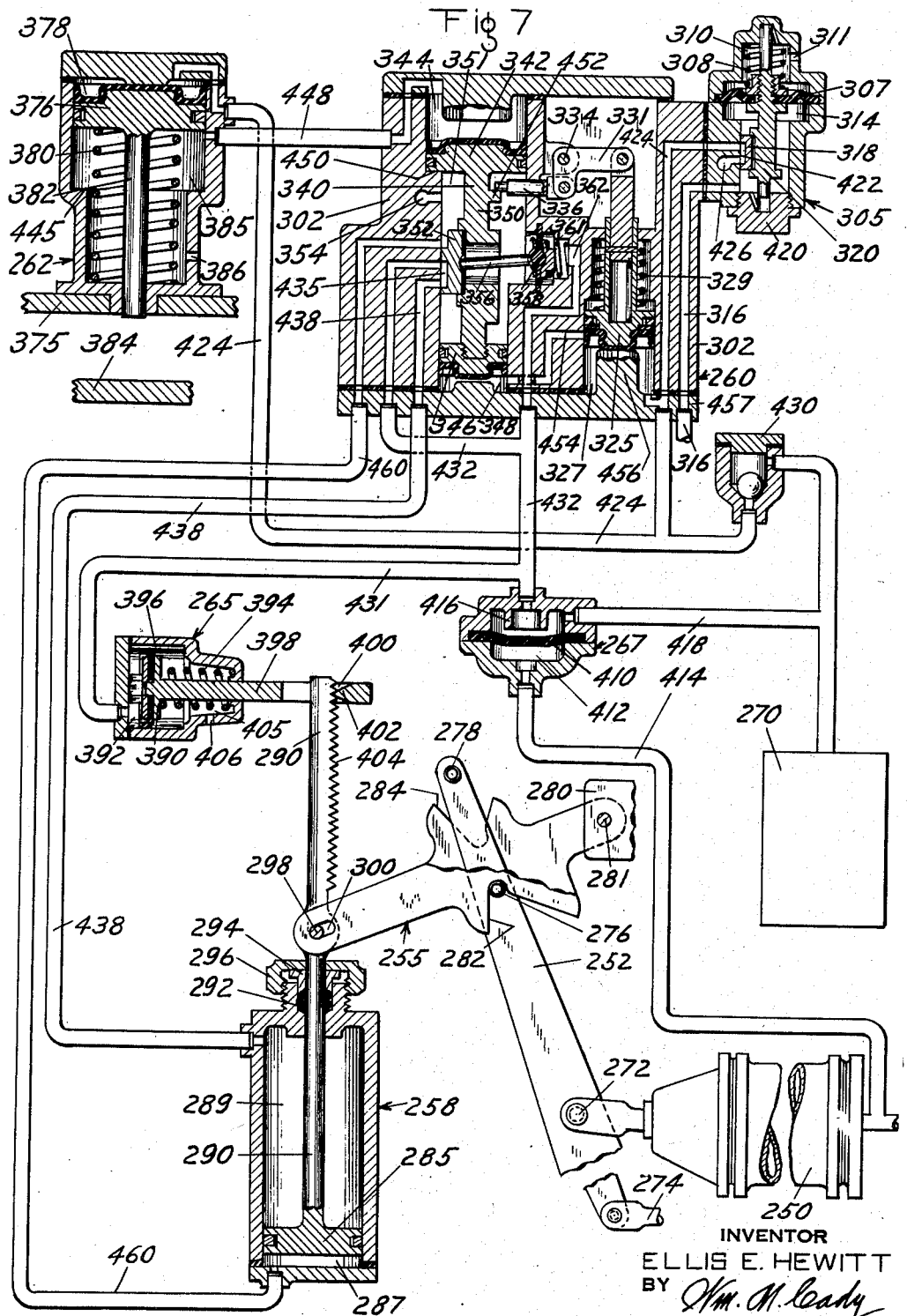

March 26, 1940.  E. E. HEWITT  2,194,751
EMPTY AND LOAD BRAKE DEVICE
Filed Nov. 27, 1935  4 Sheets-Sheet 4

INVENTOR
ELLIS E. HEWITT
BY Wm. M. Cady
ATTORNEY

Patented Mar. 26, 1940

2,194,751

UNITED STATES PATENT OFFICE 2,194,751

EMPTY AND LOAD BRAKE DEVICE

Ellis E. Hewitt, Edgewood, Pa., assignor to The Westinghouse Air Brake Company, Wilmerding, Pa., a corporation of Pennsylvania Application November 27, 1935, Serial No. 51,799

33 Claims. (Cl. 188—195)

This invention relates to fluid pressure brakes and more particularly to a fluid pressure brake equipment in which the brakes are applied with greater force on loaded cars than on empty cars.

It is an object of this invention to provide a brake equipment in which the braking force developed by the brake cylinder may be varied by varying the fulcrum point of a lever incorporated in the brake rigging.

A further object of the invention is to provide a brake equipment of the type described and having improved means controlled by the load on the car to condition the equipment for empty car operation or for loaded car operation.

Another object of the invention is to provide a brake equipment of the type described having change-over mechanism responsive to the weight of the material forming the load on the car to automatically condition the brake equipment for empty car operation or for loaded car operation, and incorporating means responsive to the pressure of the fluid in the brake pipe and to the pressure of the fluid supplied to the brake cylinder and controlling the operation of the change-over mechanism.

A further object of the invention is to provide an improved empty and load brake equipment having change-over mechanism responsive to the weight of the material forming the load on the car for automatically conditioning the brake equipment for empty car operation or for loaded car operation, together with means to prevent operation of the change-over mechanism while the brakes are applied, and to normally prevent operation of the change-over mechanism in response to conditions other than a change in the load on the car.

Another object of the invention is to provide an improved empty and load brake equipment having change-over mechanism responsive to the weight of the material forming the load on the car for automatically conditioning the brake equipment for empty car operation or for loaded car operation, and having latch means associated with the change-over mechanism and normally operative to prevent movement of the change-over mechanism from the position in which it conditions the brake equipment for empty car operation or from the position in which it conditions the brake equipment for loaded car operation.

Other objects of the invention and features of novelty will be apparent from the following description taken in connection with the accompanying drawings, in which, Fig. 1 is a diagrammatic view, largely in section, of a brake equipment embodying this invention, the equipment being shown in the position for empty car operation, Fig. 2 is a sectional view taken substantially along the line 2—2 of Fig. 1, Fig. 3 is a view of the fulcrum control means employed in the equipment shown in Fig. 1, this means being shown in the position to condition the equipment for loaded car operation, Fig. 4 is a fragmentary view, partly in section, of a different form of fulcrum control means which I may employ, Fig. 5 is a sectional view taken substantially along the line 5—5 of Fig. 4, and showing the equipment in the position for empty car operation, Fig. 6 is a view similar to Fig. 5, and showing the equipment in position for loaded car operation, Fig. 7 is a diagrammatic view, largely in section, of a modified form of brake equipment embodying my invention, and Fig. 8 is a diagrammatic view, partly in section, of another form of brake equipment embodying my invention.

Referring to Fig. 1 of the drawings the brake equipment therein illustrated comprises a brake pipe 1, a branch pipe 2, a brake controlling valve device 3, an auxiliary reservoir 5, a brake cylinder 6, a brake lever 8, fulcrum control means 10, change-over mechanism 12, strut cylinder 14, and a locking device 16.

The brake controlling valve device 3 may be of any well known construction and operates upon a reduction in the pressure of the fluid in the brake pipe to supply fluid under pressure from the auxiliary reservoir 5 to the brake cylinders 6, and on an increase in the pressure of the fluid in the brake pipe, the brake controlling valve device 3 operates to release fluid from the brake cylinder and to charge the auxiliary reservoir from the brake pipe.

The brake cylinder 6 has a piston associated therewith and the piston has a push rod which is pivotally connected to the brake lever 8 by means of a pin 20, while the brake lever 8 has connected thereto, at a point spaced from the point of connection of the push rod with the brake lever, a brake applying member in the form of a brake pull rod 22.

The brake lever 8 has associated therewith pins 24 and 25 which are secured in openings in the brake lever 8 and project from the opposite faces thereof as is best shown in Fig. 2 of the drawings.

The pins 24 and 25 are spaced apart a substantial distance and are located unequal distances from the point of connection of the push rod with the brake lever 8.

The fulcrum controlling means 10 comprises a pair of plates 31 and 32 positioned on opposite sides of the brake lever 8 between the pins 24 and 25 and pivotally secured to a portion of the car structure, indicated at 35, by means of a pin 36. As shown in Fig. 1 of the drawings the plates 31 and 32 have on the upper edges thereof notches or recesses, indicated at 38, which are adapted to receive, as will hereinafter more fully appear, the pin 24 associated with the brake lever 8, while these plates have formed in the lower edges thereof similar notches or recesses, indicated at 39, and adapted to receive the pin 25 which is also carried by the brake lever 8.

The change-over mechanism 12 includes a cut-off valve device, indicated generally by the reference numeral 40, and which, as shown in the drawings, comprises a movable abutment in the form of a diaphragm 42 which is clamped between the casing sections 44 and 45, and this diaphragm has at one side thereof a spring 49 which is mounted in a chamber 46 which is constantly connected to the atmosphere by way of a passage 47.

The diaphragm 42 has at the other side thereof a valve chamber 50 which is constantly connected with the brake pipe 1 by way of the passage and pipe 52, which communicates with the brake pipe 1 through a choke or restricted portion indicated at 54.

The valve chamber 50 has mounted therein a slide valve 56 which engages a seat formed on the casing section 45 and this valve is moved by means of a stem 58 which is secured to the diaphragm 42.

The change-over mechanism 12 includes a casing section 60 having formed therein aligned bores of unequal diameter in which are mounted a change-over piston device, indicated generally by the reference numeral 62, and comprising a head 65, which is mounted in the bore of larger diameter, and a head 67 which is mounted in the bore of smaller diameter, these heads being connected by means of a stem 69.

The head 67 has secured thereto a rod 70 which extends through an opening in the cover 72 which closes the end of the bore in which the head 67 is mounted, and the opening in this cover is sealed by means of packing 74 which surrounds the rod 70 and is held in place by means of a gland 76 and a pack nut 78.

The rod 70 has a reduced portion formed on the end thereof and has slidably mounted thereon plates 80 and 81 which are urged apart by means of a spring 82.

A member indicated generally by the reference numeral 85 is provided and has rigidly secured thereto bolts 87 which extend through the plates 80 and 81 and have mounted thereon nuts 88 which are adapted to be engaged by the plate 81, while the bolts also have formed thereon heads 89 which are adapted to engage the plate 80. The member 85 is pivotally secured to the plates 31 and 32 of the fulcrum control means 10 by means of a pin 91 which extends through elongated openings 92 formed in the ends of the plates 31 and 32.

The change-over mechanism 12 includes, in addition, a latch piston, indicated at 95, and mounted in a bore in the casing section 60. The latch piston 95 is yieldingly urged into engagement with a stop 97 formed on the cover 72 by means of a spring 99, and when the latch piston 95 is in engagement with the stop 97 it cuts off communication between the chamber 100 and a passage 101 which communicates with the chamber 103 on the face of the head 67 of the change-over piston device 62.

The latch piston 95 has a stem 105 associated therewith and pivotally secured to one arm of a bell crank 107 which is supported on an ear or projecting portion 109 formed on the casing section 60. The other arm of the bell crank 107 has pivotally secured thereto a latch piece 110 which is slidably supported in a bore in the casing section 60 and has a reduced end portion which is adapted to extend into the path of movement of and to be engaged by a projection 112 formed on the stem 69 of the change-over piston device 62.

The strut cylinder 14 comprises a casing having a bore therein in which is mounted a piston 120 which is yieldingly urged into engagement with the cover 121 by means of a spring 123, which is mounted in the chamber 125 on one side of the piston 120, this chamber being constantly connected to the atmosphere by way of a passage 127.

A port in the wall of the bore in which the piston 120 is mounted communicates by way of a pipe and passage 130 with the chamber 132 on the face of the head 65 of the change-over piston device 62, while the chamber 134 on the face of the piston 120 communicates by way of a passage and pipe 136 with a port in the seat of the slide valve 56 of the cut-off valve device 40. The passage 136 also communicates with the chamber 100 on the face of latch piston 95.

The strut cylinder 14 is mounted on a sprung portion 141 of the car structure, and the piston 120 is provided with a stem 143 which is adapted to engage an unsprung portion 145 of a car truck at certain times, as will hereinafter more fully appear.

The locking device 16 comprises a casing having a bore therein in which is mounted a piston 150, having at one side thereof a chamber 152 which is connected by way of a pipe 154 with the pipe 155 connecting the brake controlling valve device 3 and the brake cylinder 6. The piston 150 has at the other side thereof a spring 156 which yieldingly urges the piston to the left, as viewed in Fig. 1 of the drawings, while the piston 150 has associated therewith a stem 158 which projects from the casing, and is adapted at certain times to extend into the path of movement of and to be engaged by a projecting portion 160 associated with the member 85.

The equipment shown in Fig. 1 is shown in the position which it assumes when the brakes are released, with the fulcrum control means in the position to condition the apparatus for empty car braking, with the load on the car less than the predetermined amount which is required to change the equipment over from empty car braking to loaded car braking, and with the pressure of the fluid in the brake pipe maintained at substantially the value normally carried in the brake pipe.

When the pressure of the fluid in the brake pipe is maintained at a value above a value substantially less than that normally carried in the brake pipe, the pressure of the fluid in the chamber 50 of the cut-off valve 40 will be such that the force exerted by the fluid acting on the diaphragm 42, and opposing the spring 49, will overcome the spring 49 and cause the stem 58 to be moved upwardly until the end of the stem engages the bottom of the bore in the casing section 44. When the stem 58 is moved to this position, which is the position in which it is shown in Fig. 1 of the drawings, the slide valve 56 is moved to a position in which a cavity 162 therein establishes communication between the passage 136 and an atmospheric passage 163, so that the chamber 134 of the strut cylinder 14 and the chamber 100 on the face of the latch piston 95 are connected to the atmosphere.

As the chamber 134 is at atmospheric pressure the piston 120 is held in engagement with the cover 121 by means of the spring 123, and when the piston 120 is in this position, the passage 139 is open to the chamber 125 on the spring side of the piston 120 so that the chamber 132 on the face of head 65 of the change-over piston device 62 is connected to the atmosphere by way of the passage and pipe 130, the chamber 125 and the passage 127.

As the chamber 100 is at atmospheric pressure the latch piston 95 is held by means of the spring 99 in engagement with the stop 97, while the latch piston acting through the bell crank 107 maintains the latch 110 in its latching position in which the end of the latch projects into the path of movement of the projection 112 on the stem 69 of the change-over piston device 62, thereby preventing movement of the change-over piston device.

At this time the brake cylinder is at atmospheric pressure, and the chamber 152 on the face of the piston 150 of the locking device 16, therefore, is also at atmospheric pressure, and the piston 150 is held by the spring 156 in a position in which the stem 158 is out of the path of movement of the projection 160 associated with the member 85.

If the pressure of the fluid in the brake pipe is reduced, for the purpose of effecting a service application of the brakes, the brake controlling valve device 3 operates in the usual manner to supply fluid under pressure from the auxiliary reservoir 5 to the brake cylinder 6, while fluid under pressure will also flow by way of the pipe 154 to the chamber 152 on the face of the piston 150, and will move the piston 150 against the spring 156 so that the end of the stem 158 extends into the path of movement of the projecting portion 160 associated with the member 85.

On an increase in the pressure of the fluid supplied to the brake cylinder 6, the piston thereof moves to the left, as viewed in Fig. 1 of the drawings, and causes the brake lever 8 to rotate in a clockwise direction about an axis determined by the pin 25, which, when the fulcrum control means is in the position shown in Fig. 1 of the drawings, is held by the recess 39 in the fulcrum control means. This movement of the brake lever 8 causes the brake pull rod 22 to be moved to the left, as viewed in Fig. 1 of the drawings, and effects an application of the brakes.

The cut-off valve device 40 is constructed so as to remain in the position in which it is shown in Fig. 1 of the drawings until the pressure of the fluid in the brake pipe, and in the valve chamber 50, is reduced to a value substantially below the pressure to which the fluid in the brake pipe is reduced on a service application of the brakes, and accordingly it remains in the position in which it is shown during a service application of the brakes.

As the locking device 16 is operated on the supply of fluid under pressure to the brake cylinder to effect an application of the brakes, and moves to a position to prevent movement of the member 85, there is no possibility that the fulcrum control means 10 will be shifted, either intentionally or otherwise, during an application of the brakes.

On a subsequent increase in the pressure of the fluid in the brake pipe to release the brakes, the brake controlling valve device 3 operates to release fluid under pressure from the brake cylinder 6, and the return spring, not shown, causes the piston of the brake cylinder 6 to move to the right, as viewed in Fig. 1 of the drawings, thereby causing the brake lever 8 to rotate in a counter-clockwise direction about the axis determined by the pin 25, and moving the brake pull rod 22 to the right and effecting the release of the brakes.

On the release of fluid under pressure from the brake cylinder 6, fluid is also released from the chamber 152 of the locking device 16, and the spring 156 thereupon moves the piston 150 to a position in which the stem 158 no longer extends into the path of movement of the projecting portion 160.

If the pressure of the fluid in the brake pipe is reduced to atmospheric pressure, as may occur when a car is removed from a train, or is reduced to a relatively low value as may occur on an emergency application of the brakes, the pressure of the fluid in the valve chamber 50 will likewise be reduced to atmospheric pressure or to a low value, and the spring 49 will move the stem 58 downwardly until the end of the stem engages the bottom of the bore in the plug 165 which closes the end of the valve chamber 50. When the stem 58 is in this position, the slide valve 56 is in a position to cut off communication between the passage 136 and the atmospheric passage 163, and to establish communication between the passage 136 and the valve chamber 50.

Fluid present in the brake pipe, or fluid supplied thereto on a subsequent increase in the pressure of the fluid in the brake pipe 1, will flow from the brake pipe to the branch pipe 2 and through the choke 54 to the pipe and passage 52 leading to the valve chamber 50, from which fluid is permitted to flow by way of the passage 136 to the chamber 100 on the face of the latch piston 95, and also to the chamber 134 on the face of the piston 120 of the strut cylinder 14.

On an increase in the pressure of the fluid in the chamber 134 to a predetermined relatively low value, such as thirteen pounds, the piston 120 is moved downwardly against the spring 123, and if the weight of the material forming the load on the car is less than a predetermined amount, the amount of movement permitted the stem 140 before it engages the portion 145 of the car truck will be great enough to permit the piston 120 to be moved into engagement with a shoulder 167 on the casing of the strut cylinder 14, and, when the piston 120 is in this position, the port leading to the pipe 130 is open to the chamber 134. Fluid supplied from the brake pipe to the chamber 134 may thereupon flow from the chamber 134 through the pipe and passage 130 to the chamber 132 on the face of the head 65 of the change-over piston device 62. The fluid in the chamber 132 acting on the head 65 serves to maintain the head 65 in engagement with the shoulder 170 formed on the casing section 60, which is the position in which the head 65 is shown in Fig. 1 of the drawings.

On an increase in the pressure of the fluid in the valve chamber 50 and in the fluid which is supplied to the passage 136 to a somewhat higher value, such as twenty pounds, the fluid under pressure in the chamber 100 on the face of the latch piston 95 moves the latch piston against the spring 99, and its movement is transmitted through the bell crank 107 to the latch 110, causing the latch 110 to be moved to the right as viewed in Fig. 1 of the drawings, out of the path of movement of the projection 112 on the stem 69 of the change-over piston device 62.

On movement of the latch piston 95 upwardly, as viewed in Fig. 1 of the drawings, the end of the passage 101 is uncovered and fluid under pressure from the chamber 100 is permitted to flow to the passage 101 and to the chamber 103 on the face of the head 67 of the change-over piston device 62.

The fluid under pressure in the chamber 103 acting on the head 67 will be ineffective, however, to move the change-over piston device 62 upwardly because fluid at the same pressure is also present in the chamber 132 and acts upon the head 65, which is of somewhat larger area than the head 67, and prevents movement of the piston device 62 by the fluid acting on the head 67. The change-over piston device 62, therefore, remains in the position in which it is shown in the drawings, even though the latch 110 is moved away from the latching position.

On a further increase in the pressure of the fluid in the brake pipe to a higher predetermined value, such as above thirty pounds, a similar increase in the pressure of the fluid in the valve chamber 50 of the cut-off valve 40 will be effected, and when this pressure is present in the valve chamber 50, the force exerted by the fluid acting on the diaphragm 42 is sufficient to overcome the pressure of the spring 49 and the slide valve 56 will be moved to the position in which communication between the valve chamber 50 and the passage 136 is cut off, and in which the cavity 162 establishes communication between the passage 136 and the atmospheric exhaust passage 163.

On movement of the slide valve 56 to the position in which the cavity 162 establishes communication between the passage 136 and the atmospheric exhaust passage 163, which is the position in which it is shown in Fig 1 of the drawings, fluid under pressure is permitted to escape from the chamber 134 on the face of the piston 120 of the strut cylinder 14, and also from the chamber 100 on the face of the latch piston 95. In addition, fluid under pressure flows from the chamber 103, on the face of the head 67, to the chamber 100 and therefrom to the atmosphere. On a reduction in the pressure of the fluid in the chamber 100 to a predetermined pressure, such as twenty pounds, the spring 99 moves the latch piston 95 downwardly into engagement with the stop 97, thereby causing the latch 110 to be moved into the path of movement of the projection 112 on the stem 69.

On a further reduction in the pressure of the fluid in the passage and pipe 136, and in the chamber 134 on the face of the piston 120 of the strut cylinder 14, to a value somewhat less than twenty pounds, such as thirteen pounds, the piston 120 will be moved by the spring 123 into engagement with the cover 121, thereby establishing communication between the pipe and passage 130 and the chamber 125 on the spring side of the piston 120 Fluid may thereupon be released from the chamber 132 on the face of the head 65 to the atmosphere by way of the passage and pipe 130, the chamber 125 and the passage 127.

The release of fluid under pressure from the chamber 132 does not affect the change-over piston device 62 as the pressure of the fluid in the chamber 103 on the face of the head 67 has already been reduced to a relatively low value, and because the piston device 62 is held by the latch 110.

The fulcrum control means 10 will remain in the same position, therefore, and on a subsequent application of the brakes the brake lever 8 will pivot about an axis formed by the pin 25 in the manner described in detail above.

If, while the brake equipment is conditioned for empty car operation, the weight of the material forming the load on the car is increased to an amount in excess of a predetermined amount, this brake equipment will automatically condition itself for loaded car operation on a reduction in the pressure of fluid in the brake pipe to a value below that for which the cut-off valve 40 is designed to respond.

When the load on the car is increased, the sprung portion 141 of the car structure moves toward the unsprung portion of the car truck as a result of the deflection of the car springs by the weight imposed thereon, and the amount of movement of the piston 120 against the spring 123 is limited by engagement of the piston stem 149 with the portion 145 of the car truck.

When the load on the car is increased to an amount in excess of the predetermined value, and on the establishment in the brake pipe of a fluid pressure at a value below thirty pounds, the cut-off valve operates as described in detail above to move the slide valve 56 to a position to cut off communication between the passage 136 and the atmospheric exhaust passage 163, and to establish communication between the valve chamber 50 and the passage 136. Fluid may thereupon flow from the valve chamber 50 to the passage 136, which leads to the chamber 100 on the face of the latch piston 95, and to the chamber 134 on the face of the piston 120 of the strut cylinder 14.

On an increase in the pressure of the fluid in the chamber 134 the piston 120 will be forced downwardly against the spring 123, but movement of the piston will be arrested by engagement of the piston stem 140 with the unsprung portion 145 of the car truck before the piston has moved to a position to establish communication between the chamber 134 and the port leading to the pipe and passage 130. Fluid under pressure from the chamber 134 will not flow to the chamber 132, therefore, and the chamber 132 will be maintained substantially at atmospheric pressure.

On an increase in the pressure of the fluid supplied to the passage 136, and thereby to the chamber 100 on the face of the latch piston 95, to a given value, such as twenty pounds, the force exerted by the fluid under pressure acting on the piston 95 moves the piston against the spring 99, causing the latch 110 to be moved out of the path of movement of the projecting portion 112.

On movement of the latch piston 95 against the spring 99 communication is established between the chamber 100 and the passage 101 and fluid under pressure thereupon flows from the chamber 100 through the passage 101 to the chamber 103 on the face of the head 67 of the change-over piston device 62, and on an increase in the pressure of the fluid in this chamber, the change-over piston device 62 is moved upwardly.

The change-over piston device 62 is free to move at this time as the chamber 132 is maintained substantially at atmospheric pressure, while the latch 110 has previously been moved out of the path of movement of the projecting portion 112 on the stem 69 of the change-over piston device 62.

On movement of the change-over piston device 62 the rod 70 is moved upwardly, as viewed in Fig. 1 of the drawings, and it causes the plate 81 to move upwardly and its movement is transmitted through the spring 82 to the plate 80, pressing the plate 80 against the heads 89 of the bolts 87. On further upward movement of the rod 70 the member 85 is lifted and the plates 31 and 32 of the fulcrum control means 10 are moved about the pin 36 so that the notches or recesses 39 in the lower margins of these plates no longer extend around the pin 25 associated with the brake lever 8, and so that the notches or recesses 38 in the upper margins of these plates extend around the pin 24 associated with the brake lever 8.

On engagement of the bottom portion of the recesses 38 with the pin 24 further upward movement of the plates 31 and 32 is prevented, and if there is upward movement of the change-over piston device 62 subsequent to engagement of the plates 31 and 32 with the pin 24, the plate 81 will be moved against the spring 82.

On a further increase in the pressure of the fluid in the brake pipe and in the valve chamber 50 of the cut-off valve 40 to a pressure above a predetermined value, such as thirty pounds, the force exerted by the fluid under pressure acting on the diaphragm 42 will be great enough to overcome the spring 49 and the piston stem 58 will be moved upwardly so as to move the slide valve 56 to the position in which it is shown in Fig. 1 of the drawings, in which position the slide valve 56 cuts off communication between the valve chamber 50 and the passage 136 and the cavity 162 establishes communication between the passage 136 and the atmospheric exhaust passage 163.

When the slide valve 56 is moved to this position fluid under pressure is vented from the passage 136 and also from the chamber 100 and from the chamber 103, which communicates with the chamber 100 by way of the passage 101.

When the pressure of the fluid in the chamber 100 is reduced to a given value, such as twenty pounds, the latch piston 95 is moved downwardly by the spring 99 and causes the latch 110 to move into the path of movement of the projecting portion 112 on the stem 69 of the change-over piston device 62. As the change-over piston device 62 is in its upper position at this time the latch 110 extends into the recess between the projection 112 and the head 67 and serves to prevent movement of the change-over piston device 62 to the position in which it is shown in Fig. 1 of the drawings.

On the release of fluid under pressure from the passage and pipe 136, the fluid under pressure present in the chamber 134 on the face of the piston 129 of the strut cylinder 14 is released to the atmosphere and the piston 129 is moved into engagement with the cover 121, if it is not already in engagement therewith.

The choke 54, which is interposed in the pipe 52 connecting the brake pipe 1 and the valve chamber 50 of the cut-off valve 40, restricts the rate of flow of fluid from the brake pipe to the valve chamber 50, and thereby restricts the rate of increase in the pressure of the fluid in the valve chamber 50.

The choke 54 is proportioned so that irrespective of the rate at which the pressure of the fluid in the brake pipe is increased, the time required to produce an increase in the pressure of the fluid in the chamber 50 of the cut-off valve device 40 from the pressure which is required to effect movement of the latch piston 95 against the spring 99 associated therewith, which pressure may be twenty pounds, to the pressure which is required to effect movement of the diaphragm 42 against the spring 49, which pressure may be thirty pounds, will be great enough to provide time for the change-over piston device 62 to change its position.

The apparatus is now conditioned for loaded car operation.

If a reduction in the pressure of the fluid in the brake pipe is effected to produce a service application of the brakes, the brake controlling valve device 3 operates in the usual manner to supply fluid under pressure to the brake cylinder 6 and the piston of the brake cylinder causes the brake lever 8 to move about an axis determined by the pin 24, and to effect movement of the brake pull rod 22 to the left, as viewed in Fig. 1 of the drawings, and thereby produce an application of the brakes.

As the pin 24 is located a somewhat greater distance from the point of connection of the piston of the brake cylinder 6 with the brake lever 8 than is the pin 25, the rate of movement of the brake pull rod 22 relative to the rate of movement of the piston is somewhat less rapid when the brake lever moves about the pin 24 than when it moves about the pin 25. A greater force will be exerted on the brake pull rod by the piston of the brake cylinder 6, therefore, when the brake lever moves about the pin 24, than when the brake lever moves about the pin 25, with the result that a greater braking force will be developed when the apparatus is conditioned to cause the brake lever to move about the pin 24 than is developed when the apparatus is conditioned to cause the brake lever to move about the pin 25.

On the supply of fluid under pressure to the brake cylinder 6, fluid is supplied by way of the pipe 154 to the chamber 152 of the latching device 16. The piston 150 of this device thereupon moves against the spring 156 so that the stem 158 extends into the path of movement on the projecting portion 160 associated with the member 85. As the member 85 is in the upper position at this time the stem 158 extends below the projecting portion 160 and prevents movement of the member 85 downwardly, thereby preventing movement of the fulcrum control means from the loaded car position to the empty car position during an application of the brakes.

On the release of fluid from the brake cylinder 6, the return spring, not shown, causes the brake cylinder piston to move to the right as viewed in Fig. 1 of the drawings, and thereby effect movement of the brake lever 8 in a counterclockwise direction about the axis determined by the pin 24. On this movement of the brake lever 8 the brake pull rod 22 moves to the right and releases the brakes.

If while the equipment is conditioned for loaded car operation the pressure of the fluid in the brake pipe 1 is reduced to a relatively low value, such as may occur on an emergency application of the brakes, or on the complete venting of fluid from the brake pipe, as may occur when the car is removed from a train, the pressure of the fluid in the valve chamber 50 of the cut-off valve 40 will be reduced to a value such that the diaphragm 42 will be moved downwardly by the spring 49, and will move the slide valve 56 to a position to cut off communication between the passage 136 and the atmospheric exhaust passage 163, and to establish communication between the valve chamber 50 and the passage 136.

Fluid under pressure present in the brake pipe, or fluid subsequently supplied thereto flows to the valve chamber 50 from which it may thereupon flow to the passage 136 and to the chamber 100. The pressure of the fluid in this chamber may be increased to a value sufficient to cause the latch piston 95 to be moved against the spring 99, and thus move the latch 110 out of the path of movement of the projection 112 on the stem of the change-over piston device 62, which at this time is in the upper position.

On movement of the latch piston 95 fluid is permitted to flow from the chamber 100 to the chamber 103 by way of the passage 101 and increase the pressure of the fluid in this chamber, which will serve to maintain the change-over piston device 62 in the upper position, that is, the position to condition the equipment for loaded car operation.

On the supply of fluid under pressure to the passage and pipe 136 fluid will flow therethrough to the chamber 134 on the face of the strut cylinder piston 120, but assuming that the load on the car has not been changed, this piston 120 will be prevented from moving downwardly far enough to open communication between the chamber 134 and the pipe 130 by the stem 140 which engages a portion 145 of the car truck.

As no fluid will be supplied to the chamber 132 on the face of the head 65 of the change-over piston device 62, the change-over piston device 62 will remain in the upper position, even though the latch piston has been moved to a position to move the latch 110 out of the path of movement of the projecting portion 112.

If, while the brake equipment is in a position to condition the equipment for loaded car braking the load on the car is decreased to an amount less than that for which the apparatus is designed to respond, the change-over mechanism will operate automatically to change the equipment over to condition it for empty car braking as soon as the pressure of the fluid in the brake pipe is established at a predetermined relatively low value.

With the equipment conditioned for loaded car braking, and with the load on the car reduced, when the pressure of the fluid in the valve chamber 50 of the cut-off valve 40 is at a pressure less than that required to move the diaphragm 42 against the spring 49, the stem 58 will be held in its lower position and will hold the slide valve 56 in a position to cut off communication between the passage 136 and the atmospheric passage 163, and to establish communication between the valve chamber 50 and the passage 136 and permit fluid to flow from the valve chamber 50 to the passage 136 and therethrough to the chamber 100 and to the chamber 134.

On an increase in the pressure of the fluid supplied to the chamber 134 to a predetermined value, such as thirteen pounds, the piston 120 will be moved downwardly against the spring 123, and, as the weight on the car is reduced, the piston 120 will be permitted to move a distance sufficient to establish communication between the chamber 134 and the passage 130 before the stem 140 engages the unsprung portion 145 of the car truck. Fluid under pressure may then flow from the chamber 134 through the pipe and passage 130 to the chamber 132 on the face of the head 65 of the change-over piston device 62. Movement of the piston device 62 at this time is prevented, however, because the latch 110 extends into the path of the movement of the projecting portion 112 on the piston stem 69, and the projecting portion 112 will be forced into engagement with the latch.

On a further increase in the pressure of the fluid supplied to the passage 136, a corresponding increase in the pressure of the fluid in the chamber 100 will be effected, and when this pressure increases to a predetermined value, such as twenty pounds, the latch piston 95 will be moved against the spring 99, and the latch 110 will be moved out of the path of movement of the projecting portion 112 and the piston device 62 will be released.

On movement of the latch piston 95 against the spring 99 fluid under pressure is permitted to flow from the chamber 100 through the passage 101 to the chamber 103, and the fluid in this chamber acting on the head 67 opposes movement of the piston device 62 by the fluid in the chamber 132 acting on the piston 65, but because of the substantially larger area of the head 67, the piston device 62 will be moved downwardly against the fluid in the chamber 103 acting on the head 67.

On downward movement of the piston device 62, the rod 70 is moved, and it presses upon the plate 80 forcing it downwardly, and its movement is transmitted through the spring 82 to the plate 81 which engages the nuts 88 on the bolts 87 and moves the member 85 downwardly, thereby moving the fulcrum control means from the position in which the recesses 38 extend around the pin 24, to the position in which the recesses 39 extend around the pin 25, which is the position in which the fulcrum control means is shown in the drawings. The brake equipment is now conditioned for empty car braking.

On an increase in the pressure of the fluid in the brake pipe to a pressure substantially equal to that normally carried in the brake pipe the cut-off valve 40 operates as described above to release fluid under pressure from the passage 136, whereupon the latch piston 95 moves to a position to move the latch 110 to prevent movement of the change-over piston device 62, while the piston 120 of the strut cylinder 14 moves to a position to release fluid under pressure from the chamber 132.

It will be seen that the brake equipment provided by this invention incorporates means to shift the fulcrum point of a lever employed in the brake rigging, and thereby vary the braking force developed on an application of the brakes so as to condition the equipment for empty car operation or for loaded car operation.

It will be seen also that the brake equipment provided by this invention incorporates means responsive to the weight of the material forming the load on the car for operating the fulcrum control means.

In addition it will be seen that the brake equipment provided by this invention incorporates means to prevent false operation of the change-over mechanism, or to prevent operation of the change-over mechanism while the brakes are applied. Thus it will be seen that the cut-off valve operates to prevent the supply of fluid under pressure to the change-over mechanism when the pressure of the fluid in the brake pipe is above a value substantially less than that normally maintained in the brake pipe during operation of a train. This prevents operation of the change-over mechanism as the result of movement of the sprung portion of the car structure relative to the unsprung portion of the car structure while the car is in motion as a part of a train.

It will be seen also that the change-over mechanism has associated therewith latch means which operates to prevent movement of the change-over mechanism except under the conditions to which the change-over mechanism is intended to respond.

In Figs. 4 to 6, inclusive, of the drawings, I have illustrated a modified form of fulcrum control means which I may employ in place of the fulcrum control means shown in Figs. 1 and 2. As shown in these figures of the drawings the brake cylinder 200 has associated therewith an arm 202 which has a forked end in which are formed elongated openings or slots 204 which extend generally parallel to the plane of movement of the brake cylinder piston.

A brake lever 206 extends between the tines of the forked end of the arm 202 and has a pin 205 secured thereto and extending into the slots 204, while the lever has a link 208 pivotally secured thereto by means of a pin 210. The link 208 has a portion 212 thereof slidably mounted in a substantially rectangular opening in the arm 202, which opening extends generally parallel to the plane of movement of the brake cylinder piston.

The portion 212 of the link 208 has an opening 214 therein, which in one position of the link 208 is substantially in alignment with an opening 216 extending through the arm 202.

The piston of the brake cylinder 200 has associated therewith a push rod which is connected to the brake lever 206 by means of a pin 220, while the brake lever 206 has a brake applying member in the form of a pull rod 222 secured thereto.

This fulcrum control means includes a control member indicated at 225 and connected through a resilient coupling, similar to that employed in the equipment shown in Fig. 1 of the drawings, to a rod 230 associated with the change-over mechanism, and which corresponds to the rod 70 employed in the system shown in Fig. 1 of the drawings. The member 225 is located in the opening 216 in the arm 202, and is adapted to be moved axially in this opening by means of the change-over mechanism.

In order to condition the equipment for empty car braking the change-over mechanism operates to move the member 225 into the opening 216 in the arm 202 so that the member 225 extends through the opening 214 in the portion 212 of the link 208 and is in the position shown in Figs. 4 and 5 of the drawings.

With the member 225 in this position, on the supply of fluid under pressure to the brake cylinder the piston of the brake cylinder moves the brake lever 206 and causes it to pivot about the pin 210 in a clockwise direction, and moves the brake pull rod 222 to the left as viewed in Fig. 4 of the drawings. During this movement of the brake lever 206 about the pin 210, the pin 205 moves to the right, as viewed in Fig. 4 of the drawings, in the slots 204 in the ends of the arm 202.

When the equipment is conditioned for load braking the change-over mechanism operates to hold the member 225 out of the opening 214 in the portion 212 of the link 208, so that the member 225 is substantially in the position in which it is shown in Fig. 6 of the drawings.

With the fulcrum control means in this position, in the supply of fluid under pressure to the brake cylinder 200 the piston of the brake cylinder moves the brake lever 206 and causes it to rotate about the pin 205 which is held by the left hand ends of the slots 204, and on movement of the brake lever 206, the link 208 is moved to the left, as viewed in Fig. 4 of the drawings, while the pull rod 222 is moved to the left to effect an application of the brakes.

As the fulcrum point of the brake lever 206 is located somewhat farther from the point of connection of the brake cylinder piston with the brake lever when the brake lever moves about the pin 205 than it is when the brake lever moves about the pin 210, the rate of movement of the brake pull rod 222 relative to the rate of movement of the brake cylinder piston is less rapid when the brake lever moves about the pin 205 than when the lever moves about the pin 210, with the result that a greater braking force will be produced when the brake lever moves about the pin 205 than is the case when the brake lever is pivoted about the pin 210.

With the apparatus conditioned for load braking, on the release of fluid under pressure from the brake cylinder 200 the return spring, not shown, returns the brake rigging to the release position and causes the brake lever 206 to be returned substantially to the position in which it is shown in Fig. 4 of the drawings, and on this movement of the brake lever 206 the link 208 is moved to the right, as viewed in Fig. 4 of the drawings, in the opening in the arm 202 so that the opening 214 through the portion 212 of the link 208 is returned to a position substantially in alignment with the opening 216 through the arm 202. The change-over mechanism may then operate to return the member 225 to the position in which it is shown in Fig. 5 of the drawings, so as to again condition the apparatus for empty car braking.

In Fig. 7 of the drawings I have illustrated a modified form of brake equipment embodying my invention. This equipment is generally similar to that shown in Fig. 1 of the drawings, and, as shown, comprises a brake cylinder 250, a brake lever 252, fulcrum controlling means 255, change-over cylinder 258, change-over control mechanism 260, a strut cylinder 262, a locking device 265, a fluid pressure operated valve device 267, and a supply reservoir 270.

The brake lever 252 is similar to the brake lever employed in the equipment shown in Fig. 1, and has the brake cylinder piston rod secured thereto by means of a pin 272, and also has a brake applying member, in the form of a brake pull rod 274, secured thereto. In addition the brake lever 252 has associated therewith spaced pins 276 and 278, which are adapted to be engaged by the fulcrum control means 255.

The fulcrum control means 255 is similar to the fulcrum control means 10 employed in the system shown in Fig. 1 and comprises spaced plates, located on opposite sides of the brake lever 252, and pivotally secured by means of a pin 281 to a portion of the car structure indicated at 280. The fulcrum control means has notches or recesses 282 and 284 formed in the opposite sides or margins and adapted to cooperate with the pins 276 and 278, respectively.

The change-over cylinder 258 comprises a casing having a bore therein, in which is mounted a piston 285, which is subject on one side to the pressure of the fluid in a chamber 287, and is subject on the other side to the pressure of the fluid in a chamber 289, and has associated therewith a stem 290 which extends through an opening in the end wall of the chamber 289. The opening through which the stem 290 extends is sealed by means of packing, indicated at 292, which is held in place by means of a gland 294 and a pack nut 296.

The stem 290 has a pin 298 associated therewith and extending into elongated openings 300 in the ends of the plates of the fulcrum control means.

The change-over control mechanism 260 comprises a casing 302 having secured thereto a cut-off valve device 305.

The cut-off valve device 305 comprises a movable abutment in the form of a diaphragm 307, which is subject on one side to the pressure of a spring 308 mounted in a chamber 310, which is connected to the atmosphere by way of a passage 311.

The diaphragm 307 is subject on the other side to the pressure of the fluid in a valve chamber 314, which is constantly connected to the brake pipe by way of a passage and pipe 316. The valve chamber 314 has positioned therein a slide valve 318 slidable upon a seat formed on the housing of the cut-off valve device, and adapted to be operated by means of a stem 320 associated with the diaphragm 307.

The change-over control mechanism also includes a latch piston 325 mounted in a bore in the casing 302, and subject on one side to the pressure of the fluid in a chamber 327, and on the other side to a spring 329.

The latch piston 325 has a stem associated therewith which is connected to one arm of the bell crank 331, which is pivotally supported by means of a pin 334 on projections formed on the casing 302. The other arm of the bell crank 331 has a latch piece 336 associated therewith and slidably mounted in a bore in the wall of the casing section 302.

The body 302 of the change-over control mechanism 260 has a bore therein having portions of unequal diameter in which is mounted a change-over piston device 340, which, as shown, includes a head 342, which is subject on one side to the pressure of the fluid in a chamber 344, while the change-over piston device 340 includes, in addition, a head 346, which is subject on one side to the pressure of the fluid in a chamber 348. The heads 342 and 346 are connected by means of a stem 350 which operates a slide valve 352 mounted in a chamber 351 intermediate the heads 342 and 346, which chamber is constantly connected to the atmosphere by way of a passage 354.

The slide valve 352 is held in engagement with its seat by means of a strut 356 which is engaged by one side of a diaphragm 358, which is subject on the other side to the pressure of a spring 361 and to the pressure of the fluid in a chamber 362.

The strut cylinder 262 is substantially identical in construction with the strut cylinder 14 employed in the equipment shown in Fig. 1 of the drawings, and, as shown, comprises a casing, which is secured to a sprung portion of the car structure, indicated at 375. This casing has a bore therein, in which is mounted a piston 376, which is subject on one side to the pressure of the fluid in a chamber 378, and which is subject on the other side to a spring 380. The piston 376 has associated therewith a stem 382 which is adapted to engage an unsprung portion 384 of the car truck. The chamber 385 on the spring side of the piston 376 is constantly connected to the atmosphere by way of a passage 386.

The locking device 265 comprises a casing having a bore therein in which is mounted a piston 390, which is subject on one side to the pressure of the fluid in the chamber 392, and is subject on the other side to a spring 394. The wall of the bore in which the piston 390 is mounted has a groove 396 formed therein and extending around the piston in all positions of the piston and being adapted to permit fluid under pressure from the chamber 392 to flow around the piston at a slow rate.

The piston 390 has a stem 398 associated therewith, and this stem has an opening 400 therein through which extends the end of the stem 290 of the piston of the change-over cylinder 258, and the face of this opening remote from the piston 390 has a tooth 402 formed thereon and adapted to extend into a recess between the teeth 404 cut in the face of the stem 290. The chamber 405 on the spring side of the piston 390 is constantly connected to the atmosphere by way of a passage 406.

The fluid pressure operated valve device 267 comprises a movable abutment in the form of a diaphragm 410, which is subject on one side to the pressure of the fluid in a chamber 412, which is constantly connected to the brake cylinder by way of a pipe 414. The other face of the diaphragm 410 is adapted to engage a seat rib 416, while the area outwardly of this seat rib is connected to the supply reservoir 270 by way of a pipe 418. The area inwardly of the seat rib 416 is connected to the chamber 392 of the locking device 265 by way of a pipe 431, and is connected to a port in the seat of the slide valve 352 by way of a pipe and passage 432 which is also connected to the chamber 362 on the spring side of the diaphragm 358.

The brake equipment shown in Fig. 7 is shown in the position which it assumes when the brake equipment is positioned for empty car operation, when the pressure of the fluid in the brake pipe is maintained substantially at the pressure normally carried in the brake pipe, and when the load on the car is less than that for which the change-over control mechanism is designed to respond to change the equipment over to loaded car operation.

When the equipment is in this position, if the pressure of the fluid in the brake pipe is reduced so as to produce a service application of the brakes, the brake controlling valve device, not shown, operates in the usual manner to supply fluid under pressure to the brake cylinder 250, and, on an increase in the pressure of the fluid supplied to the brake cylinder, the piston thereof moves the brake lever 252 about the axis determined by the pin 276 and the fulcrum control means 255, thereby moving the brake pull rod 274 to the left as viewed in Fig. 7 of the drawings, and producing an application of the brakes.

On an increase in the pressure of the fluid supplied to the brake cylinder 250, a similar increase will be effected in the pressure of the fluid in the chamber 412 of the fluid pressure operated valve device 267 and the diaphragm 410 will be pressed into engagement with the seat rib 416.

On the subsequent increase in the pressure of the fluid in the brake pipe, the brake controlling valve device operates in the usual manner to release fluid under pressure from brake cylinder, and on a reduction in the pressure of the fluid in the brake cylinder, a similar reduction in the pressure of the fluid in the chamber 412 of the fluid pressure operated valve device 267 takes place.

On the release of fluid from the brake cylinder, the return spring, not shown, returns the brake cylinder piston to the release position and causes the brake lever 252 to move in a counterclockwise direction about the axis determined by the pin 276, while the pull rod 274 is moved to the right so as to release the brakes.

The reduction in the pressure of the fluid in the brake pipe which occurs during a normal service application of the brakes does not lower the brake pipe pressure enough to reduce the pressure of the fluid in the valve chamber 314 of the cut-off valve device 305 to a value insufficient to overcome the spring 308. During a service application of the brakes, therefore, the cut-off valve device 305 remains in the position in which it is shown in the drawings and the change-over control mechanism does not operate in any way.

On a reduction in the pressure of the fluid in the brake pipe to a relatively low value, such as may occur on an emergency application of the brakes, or to atmospheric pressure, which will occur when the car is removed from a train, the pressure of the fluid in the valve chamber 314 of the cut-off valve 305 will be reduced below the value required to hold the diaphragm 307 against the spring 308, and the spring 308 will thereupon move the diaphragm 307 and the stem 320 downwardly until the end of the stem engages the bottom of the bore in the plug 420 which closes one end of the valve chamber.

On this movement of the stem 320 the slide valve 318 is moved from the position in which it is shown, in which a cavity 422 in the slide valve establishes communication between the passage 424 and an atmospheric passage 426, to a position to cut off communication between the passage 424 and the atmospheric passage 426, and to establish communication between the passage 424 and the valve chamber 314.

On an increase in the pressure of the fluid in the brake pipe, which may occur as a result of recharging of the brake system in the train, or on the connection of the car into a train, fluid under pressure will be supplied to the valve chamber 314 from the brake pipe by way of the pipe and passage 316, and from the valve chamber 314 fluid flows through the passage 424, past the check valve 430 to the reservoir 270, charging this reservoir with fluid under pressure.

Fluid will also flow through the pipe 418 to the fluid pressure operated valve device 267, and, if at this time fluid under pressure is present in the brake cylinder 250, the diaphragm 410 will be held in engagement with the seat rib 416, and fluid under pressure from the pipe 418 cannot flow past the seat rib 416 to the pipe 431 and the pipe 432.

If, however, at this time the brake cylinder 250 is substantially at atmospheric pressure fluid under pressure supplied to the pipe 418 will move the diaphragm 410 away from the seat rib 416, if it is not already out of engagement therewith, whereupon fluid under pressure will flow past the seat rib 416 to the pipe 431 which leads to the locking device 265.

On an increase in the pressure of the fluid supplied to this pipe, and to the chamber 392, the piston 390 will be moved against the spring 394 and the stem 398 thereof will be moved to the right, as viewed in Fig. 7 of the drawings, so as to move the tooth 402 out of engagement with the teeth 404 on the stem 290 of the change-over cylinder 258. Fluid under pressure which is supplied to the chamber 392 flows through the groove 396 at a restricted rate to the spring side of the piston 390, and therefrom to the atmosphere through the passage 406.

Fluid which is supplied to the pipe 432 flows therethrough to the chamber 362 on the spring side of the diaphragm 358, and increases the force exerted on this diaphragm and operates through the strut 356 to hold the slide valve 352 on its seat.

Fluid which is supplied to the pipe 432 also flows therethrough to a port in the seat of the slide valve 352, and when the slide valve 352 is in the position in which it is shown in the drawings, which is the position in which it is located when the equipment is conditioned for empty car operation, a cavity 435 therein establishes communication between the passage 432 and the passage and pipe 438, which communicates with the chamber 289 on one side of the piston 285 of the change-over cylinder 258. Fluid may therefore flow from the passage 432 to the passage and pipe 438 and therefrom to the chamber 289, and, on an increase in the pressure of the fluid in this chamber, the piston 285 will be moved to the position in which it is shown in Fig. 7 of the drawings, if it is not already in that position, and the piston 285 will be maintained in this position by the fluid in the chamber 289.

Fluid which is supplied to the passage 424 also flows by way of the pipe 424 to the chamber 378 on the face of the piston 376 of the strut cylinder 262, and on an increase in the pressure of the fluid in this chamber to a relatively low predetermined value, such as thirteen pounds, the force exerted by the fluid under pressure acting on the piston 376 overcomes the opposing force of the spring 380, and the piston 376 is moved downwardly into engagement with a shoulder 445 formed on the casing of the strut cylinder.

When the piston 376 moves into engagement with the shoulder 445, communication is established between the chamber 378 and the passage and pipe 448 leading to the chamber 344 on the face of the head 342 of the change-over piston device 340.

Fluid under pressure which is supplied to the chamber 344 acts upon the head 342 and maintains this head in engagement with a shoulder 450 formed on the casing section 302.

Fluid under pressure which is supplied from the valve chamber 314 to the passage 424 also flows therethrough to the chamber 327 on the face of the latch piston 325, and, on an increase in the pressure of the fluid in this chamber to a value somewhat higher than is required to effect movement of the piston 376 of the strut cylinder 262 against the spring 380 associated therewith, such as twenty pounds, the latch piston 325 will be moved against the spring 329, and its movement will be transmitted through the bell crank 331 and will cause the latch 336 to be moved out of the path of movement of the projection 452 formed on the stem 350 of the change-over piston device 340.

On movement of the latch piston 325 against the spring 329 communication is established between the chamber 327 and a passage 454 leading to the chamber 348 on the face of the small head 346 of the piston device 340, so that fluid under pressure may flow from the chamber 327 to the chamber 348. Fluid under pressure in the chamber 348 acts upon the head 346 and urges the change-over piston device 340 to move upwardly against the fluid under pressure in the chamber 344 acting on the head 342, but because of the greater area of the head 342, the fluid acting on the head 346 is ineffective to move the change-over piston device 340 while fluid under pressure is supplied to the chamber 344.

On a further increase in the pressure of the fluid in the brake pipe a similar increase will be effected in the pressure of the fluid in the valve chamber 314 of the cut-off valve 305, and, on an increase in the pressure of the fluid in the valve chamber 314 to a value above that to which the cut-off valve is adapted to respond, the fluid under pressure acting on the diaphragm 307 will move the diaphragm against the spring 308, and the slide valve 318 will be moved to the position in which it is shown in the drawings, in which position it cuts off communication between the valve chamber 314 and the passage 424, while the cavity 422 in the slide valve establishes communication between the passage 424 and the atmospheric passage 426. This releases fluid under pressure from the passage 424, and fluid will thereupon be released from the chamber 327, and on a reduction in the pressure of the fluid in this chamber, fluid will flow thereto from the chamber 348 through the passage 454. When the pressure of the fluid in the chamber 327 is reduced to a value less than required to overcome the spring 329, this spring will move the latch piston 325 downwardly, as viewed in Fig. 7 of the drawings, into engagement with the stop 456 formed on the casing pipe bracket section 457, and on this movement of the latch piston 325 the latch piece 336 will be moved into the path of movement of the projecting portion 452.

Upon the release of fluid under pressure from the passage 424 fluid is also permitted to escape from the chamber 378 on the face of the piston 376 of the strut cylinder 262 to the atmosphere, while fluid under pressure also flows to the atmosphere from the chamber 344 on the face of the head 342 of the change-over piston device 340, which chamber is in communication with the chamber 378 at this time by way of the passage and pipe 448.

When the pressure of the fluid in the chamber 378 is reduced to a value less than that required to overcome the spring 380, the piston 376 is moved upwardly by the spring 380, thereby establishing communication between the pipe and passage 448 and the chamber 385 on the spring side of the piston 376. Thereafter fluid under pressure is permitted to escape from the chamber 344 to the atmosphere by way of the chamber 385 and the passage 386.

On the release of fluid under pressure from the passage 424 the check valve 430 operates to prevent back flow of fluid to the passage 424 from the reservoir 270, the chamber 392 of the locking device 265, and the chamber 289 of the change-over cylinder 258.

Fluid under pressure present in the chamber 392 of the locking device 265 is permitted to escape to the atmosphere at a restricted rate through the groove 396, and, as this chamber is connected through the valve device 267 with the reservoir 270, and through the cavity 435 in the slide valve 352 with the chamber 289 of the change-over cylinder 258, the reservoir 270 and the chamber 289 will be reduced to atmospheric pressure after a time interval.

When the pressure of the fluid in the chamber 392 is reduced to a predetermined low value by the escape of fluid therefrom through the groove 396, the spring 394 moves the piston 390 to the left, as viewed in Fig. 7 of the drawings, with the result that the stem 398 moves the tooth 402 into a recess between the teeth 404 on the stem 299, thereby locking the change-over cylinder and preventing movement of the fulcrum control means.

The brake equipment will remain in condition for empty car operation and is prevented from moving from this position by the latch means associated with the change-over piston device and by the locking device associated with the change-over cylinder as long as the pressure of the fluid in the brake pipe is maintained substantially at the pressure normally carried in the brake pipe so that the cut-off valve 305 cuts off the supply of fluid to the change-over mechanism and the control means therefor.

If at the time that the cut-off valve device 305 operates to supply fluid under pressure to the passage 424 the brakes are applied, the diaphragm 410 will be held against the seat rib 416 by the fluid in the chamber 412. Fluid from the pipe 418, therefore, will not flow past the seat rib 416 to the pipe 431 leading to locking device 265 nor to the pipe 432 leading to the change-over cylinder 258.

The reservoir 270 will be charged with fluid under pressure, however, and on the subsequent release of the brakes, the fluid from the pipe 418 will move the diaphragm 410 away from the seat rib 416, and will flow past the seat rib to the chamber 392 of the locking device 265 and through the cavity 435 in the slide valve 352 to the chamber 289 of the change-over cylinder 258. The fluid which is supplied to the locking device 265 will move the piston 390 against the spring 394 so as to release the stem 299 of the change-over cylinder 258, while the fluid which is supplied to the chamber 289 of the change-over cylinder 258 urges the piston 285 to the position to condition the equipment for empty car operation, if it is not already in this position, and to maintain the piston in this position while the piston of the locking device 265 is in the release position.

Fluid in the reservoir 270, in the chamber 289 of the change-over cylinder 258, and in the chamber 392 of the locking device 265 escapes to the atmosphere at a restricted rate through the groove 396 as explained above.

If, while the brake equipment is conditioned for empty car operation the load on the car is increased, this brake equipment will operate automatically to condition the equipment for loaded car operation.

When the load on the car is increased, the sprung portion 375 of the car is moved closer to the unsprung portion 384 of the car truck. On the subsequent establishment of a pressure in the brake pipe below that for which the cut-off valve 305 is constructed to respond, the cut-off valve operates to establish communication between the slide valve chamber 314 and the passage 424, and fluid under pressure supplied from the brake pipe to the slide valve chamber 314 flows through the passage 424, past the check valve 430 to the reservoir 270 and charges this reservoir with fluid under pressure.

Fluid which is supplied to the passage 424 and flows past the check valve 430 also flows by way of the pipe 418 to the valve device 267, and assuming that the brakes are released, the diaphragm 410 will be held away from the seat rib 416 by the fluid supplied through the pipe 418. Fluid will thereupon flow past the seat rib 416 to the pipe 431 leading to the chamber 392 on the face of the piston 390 of the locking device 265. On an increase in the pressure of the fluid in the chamber 392 the piston 390 will be moved to the right against the spring 394 and the tooth 402 will be moved out of engagement with the teeth 404 on the stem 290 of the change-over cylinder piston 285.

Fluid which flows past the seat rib 416 also flows by way of the pipe 432 to the chamber 362 on the spring side of the diaphragm 358, forcing this diaphragm to the left as viewed in the drawings, and the force exerted on the diaphragm 358 is transmitted through the strut 356 to the slide valve 352 to hold the slide valve on its seat.

Fluid which is supplied to the pipe 432 also flows to the port in the seat of the slide valve 352, and as the slide valve is in the position to condition the equipment for empty car operation, the cavity 435 in the slide valve establishes communication between the passage 432 and the pipe 438 so that fluid flows from the pipe 432 to the passage 438 and therethrough to the chamber 289 of the change-over cylinder 258.

As the piston 285 is already in the position to condition the equipment for empty car operation no movement of the piston occurs as a result of the increase in the pressure of the fluid in the chamber 289, and the piston 285 is maintained in the position in which it is shown in the drawings as a result of the increase in the pressure in the chamber 289.

Fluid which is supplied to the passage 424 also flows therefrom to the chamber 378 on the face of the piston 376 of the strut cylinder 262, and, on an increase in the pressure of the fluid in this chamber, the piston 376 is forced downwardly against the spring 380, but after a limited amount of movement of the piston 376 the stem 382 engages the portion 384 of the car truck and prevents further downward movement of the piston 376.

If the load on the car exceeds a predetermined amount, the sprung portion 375 of the car structure will be located so near the unsprung portion 384 of the car truck that the downward movement of the piston 376 against the spring 380 will be arrested before the piston has moved to a position to establish communication between the chamber 378 and the passage 448 leading to the chamber 344 on the face of the head 342 of the change-over piston device 340. The chamber 344, therefore, will be maintained substantially at atmospheric pressure.

Fluid which is supplied to the passage 424 flows to the chamber 327 on the face of the latch piston 325, and on an increase in the pressure of the fluid in this chamber to a predetermined value, the latch piston 325 is moved against the spring 329, and movement of the latch piston effects movement of the latching member 336 out of the path of movement of the projecting portion 452 on the stem 350 of the change-over piston device 340.

On movement of the latch piston 325 against the spring 329 communication is established between the chamber 327 and the passage 454, and fluid thereupon flows from the chamber 327 through the passage 454 to the chamber 348 on the face of the head 346 of the change-over piston device 340.

Upon an increase in the pressure of the fluid in the chamber 348, the change-over piston device 340 is moved upwardly, as viewed in Fig. 7 of the drawings, and the slide valve 352 is moved from the position in which the cavity 435 establishes communication between the passage 432 and the passage 438 to a position in which the cavity 435 establishes communication between the passage 432 and the passage 460 leading to the chamber 287 on a face of the piston 285 of the change-over cylinder 258, and in this position of the slide valve 352 the passage 438 is open to the slide valve chamber 351 which is open to the atmosphere by way of a port 354. Fluid under pressure present in the chamber 289 will, therefore, escape to the atmosphere by way of the valve chamber 351 and the passage 354.

Movement of the change-over piston device 340 as a result of the increase in the pressure of the fluid in the chamber 348 occurs at this time as the chamber 344 on the face of the head 342 is substantially at atmospheric pressure. In addition, it will be seen that the latch 336 is moved out of the path of movement of the projecting portion 452.

When the slide valve 352 moves to the position in which the cavity 435 establishes communication between the passage 432 and the passage 460, fluid under pressure from the reservoir 270 flows through the passage 432 and through the cavity 435 to the passage 460, and by way of the passage and pipe 460 to the chamber 287. On an increase in the pressure of the fluid in the chamber 287 the piston 285 moves upwardly, as viewed in Fig. 7 of the drawings, and moves the fulcrum control means 255 from the position in which it is shown in Fig. 7 of the drawings to the position in which the notch or recess 284 in the upper margin of the fulcrum control means extends around the pin 278, and in which the notch or recess 282 is moved away from the pin 276.

Movement of the piston 285 of the change-over cylinder 258 is permitted at this time as the chamber 289 is substantially at atmospheric pressure, while the locking device 265 has been moved to the release position.

On an increase in the pressure of the fluid in the valve chamber 314 of the cut-off valve device 305 to a value above thirty pounds, the diaphragm 307 is moved upwardly against the spring 308, and the slide valve 318 is moved to a position to cut off communication between the valve chamber 314 and the passage 424, while the cavity 422 establishes communication between the passage 424 and the atmospheric exhaust passage 426.

On the release of fluid from the passage 424 fluid will be released from the chamber 327, and also from the chamber 348, which communicates with the chamber 347 by way of the passage 454, and on a reduction in the pressure of the fluid in the chamber 327 to a value less than that required to overcome the spring 329, the latch piston 325 will be moved downwardly by the spring 325 and the latch 336 will be moved into the path of movement of the projection 452. As the change-over piston device 340 is now in its upper position, the latch 336 will extend below the projection 452 instead of above the projection, as shown in the drawings, and will operate to prevent return movement of the change-over piston device 340 to the lower position.

In addition, on the release of fluid from the passage 424 fluid will be released from the chamber 378 on the face of the piston 376 of the strut cylinder 262, and this piston will be moved into engagement with the cover of the cylinder if it is not already in engagement therewith.

On the release of fluid from the passage 424 the flow of fluid to the atmosphere through the passage 424 from the reservoir 270 is prevented by the check valve 430 which prevents back flow of fluid from the reservoir.

The reservoir 270 and the chamber 287 of the change-over cylinder 258, as well as the chamber 392 of the locking device 265 will be reduced to atmospheric pressure by the release of fluid from the chamber 392 through the groove 396. As the rate of flow of fluid through the groove 396 is relatively slow these chambers will not be reduced to atmospheric pressure until a substantial time interval has elapsed.

With the fulcrum control means 255 in its upper position, that is the position to condition the equipment for loading car operation, on the supply of fluid under pressure to the brake cylinder 250, the brake lever 252 pivots about the axis determined by the pin 278.

If at the time at which the load on the car is increased the brake equipment is conditioned for empty car braking and the brakes are applied, and the pressure of the fluid in the brake pipe is below the pressure for which the cut-off valve 305 is constructed to respond, fluid under pressure will be supplied to the passage 424 from the cut-off valve device and will flow therefrom to the latch piston chamber 327 and to the chamber 348 on the face of the head 346 of the change-over piston device 340.

The latch piston and the change-over piston will operate as described in detail above, and the slide valve 352 will be moved to the position to cut off communication between the passage 432 and the passage 438 and establish communication between the passage 432 and the pipe and passage 460. At the same time communication is established between the passage 438 and the valve chamber 351.

Fluid which is supplied to the passage 424 will also flow past the check valve 430 to the reservoir 270, but as the brakes are applied the diaphragm 410 will be held in engagement with the seat rib 416 by the fluid under pressure in the chamber 412. As long as the brakes are applied, therefore, fluid under pressure will not be supplied from the reservoir 270 to the locking device 265 or through the passage 432 to the port in the seat of the slide valve 352, and therefrom by way of the passage 460 to the chamber 287 of the change-over cylinder 258. The brake equipment, therefore, will remain in the position for empty car braking as long as the brakes are applied.

On the subsequent release of the brakes, which may be accompanied by an increase in the pressure of the fluid in the brake pipe to a value above that for which the cut-off valve device 305 is adjusted to respond, the fluid in the passage 424 and the connected chambers will be released to the atmosphere as described in detail above. The fluid in the reservoir 270 will be retained, however, as the check valve 430 prevents back flow from the reservoir 270.

On the release of fluid from the brake cylinder 250 fluid will be released from the chamber 412 and the diaphragm 410 will be moved away from the seat rib 416 by fluid supplied through the pipe 418 to the chamber outwardly of the seat rib 416, and fluid from the reservoir 270 will then flow past the seat rib 416 to the pipe 431 leading to the chamber 392. On an increase in the pressure of the fluid in this chamber, the piston 399 will be moved against the spring 394 and the tooth 402 will be moved out of engagement with the teeth 404 on the stem 290 of the change-over cylinder piston 285.

Fluid from the reservoir 270 will also flow past the seat rib 416 to the pipe 432, and therethrough to the port in the seat of the slide valve 352, through the cavity 435 to the passage and pipe 460, and to the chamber 287 on the face of the piston 285. On an increase in the pressure of the fluid in this chamber, the piston 285 will be moved upwardly and will move the fulcrum control means 255 to the position to condition the equipment for loaded car braking.

After a time interval the pressure of the fluid in the chamber 287, in the reservoir 270, and in the chamber 392 will be reduced by the release of fluid from the chamber 392 to the atmosphere through the groove 396, and the piston 399 will be moved to the left, as viewed in Fig. 7 of the drawings, by the spring 394 so that the tooth 402 will again be moved into engagement with the teeth 404 on the stem 399 to prevent unintended movement of the piston of the change-over cylinder.

The rate of flow of fluid through the groove 396 is such that the pressure of the fluid in the reservoir 270 will not be reduced to atmospheric pressure until a substantial time interval has elapsed. This provides time for the change-over control mechanism, and for the change-over cylinder, to operate and change the brake equipment over from the condition for empty car operation to the condition for loaded car operation before the pressure of the fluid employed in the change-over operation has been depleted.

This brake equipment will also operate automatically to condition the equipment for empty car operation, if, while the brake equipment is conditioned for loaded car operation, the load on the car is decreased.

When the load on the car is decreased the sprung portion 375 of the car is moved away from the unsprung portion 384 of the car truck. On the subsequent establishment of a pressure in the brake pipe below that for which the cut-off valve 305 is constructed to respond, the spring 308 will move the slide valve 318 to the position in which communication between the passage 424 and the atmospheric passage 426 is cut off, and in which the passage 424 communicates with the slide valve chamber 314. Fluid under pressure will thereupon be supplied from the slide valve chamber 314 to the passage 424, and the fluid which is supplied to this passage flows past the check valve 430 to the reservoir 270 and charges this reservoir with fluid under pressure.

Fluid is also supplied through the pipe 418 to the valve device 267, and if at this time the brakes are released, the fluid supplied to the valve device 267 holds the diaphragm 410 away from the seat rib 416 and fluid under pressure flows past the seat rib to the pipe 431 and to the chamber 392 in the locking device 265. On an increase in the pressure of the fluid in this chamber the piston 390 is moved to the right against the spring 394, thereby moving the tooth 402 away from the teeth 404 on the stem 290. In addition, on the supply of fluid to the valve device 267, fluid is supplied to the pipe 432 leading to the spring side of the diaphragm 358 and also to the port in the seat of the slide valve 352. As the slide valve is in the position which it assumes when the apparatus is conditioned for loaded car braking, the cavity 435 establishes communication between the passage 432 and the passage 460 and fluid will flow through the passage and pipe 460 to the chamber 287 of the change-over cylinder 258 and will maintain the piston 285 in the position for loaded car operation.

Fluid which is supplied to the passage 424 also flows to the chamber 378 on the face of the piston 376 of the strut cylinder 262, and on an increase in the pressure of the fluid in this chamber to a predetermined value, the piston 376 is moved downwardly against the spring 380, and, as the weight on the car has been reduced, the stem 382 will not engage the portion 384 of the car truck and the piston 376 will be moved into engagement with the shoulder 445. When the piston 378 is in this position communication is established between the chamber 378 and the passage and pipe 448 so that fluid under pressure from the chamber 378 flows through the pipe and passage 448 to the chamber 344 on the face of the head 342 of the change-over piston device 340.

Fluid which is supplied to the passage 424 also flows to the chamber 327 on the face of the latch piston 325, and on an increase in the pressure of the fluid in this chamber to a value somewhat higher than is required to effect movement of the piston 376 of the strut cylinder 262 against the spring 380, the latch piston 325 is moved against the spring 329, thereby releasing the latch 336, which is moved out of the path of movement of the projection 452.

In addition, on movement of the latch piston 325, communication is established between the chamber 327 and the passage 454, so that fluid under pressure from the chamber 327 flows through the passage 454 to the chamber 348 on the face of the head 346 of the change-over piston device 340.

On the release of the latch piece 336 the change-over piston device 340 will be moved downwardly into engagement with the shoulder 450 by fluid under pressure in the chamber 344 acting on the head 342, and, because of the greater area of the head 342, this movement will occur even though fluid under pressure is supplied to the chamber 348 on the face of the head 346.

On this movement of the change-over piston device 340 the slide valve 352 is moved from the position in which the cavity 435 establishes communication between the passage 432 and the passage 460 to the position in which the cavity 435 establishes communication between the passage 432 and the passage 438, while communication is established between the passage 460 and the slide valve chamber 351 and thereby to the atmosphere by way of the passage 354. This permits the fluid in the chamber 287 of the change-over cylinder to escape to the atmosphere.

On movement of the slide valve 352 to the position to establish communication between the passage 432 and the passage 438, fluid from the passage 432 flows through the cavity 435 and through the passage and pipe 438, to the chamber 289 in the change-over cylinder 258.

On an increase in the pressure of the fluid in the chamber 289, the piston 285 will be moved from its load position, thereby returning the fulcrum control means 255 to the position in which it is shown in the drawings, in which position it conditions the apparatus for empty car braking.

The piston 285 of the change-over cylinder is free to move at this time as the locking device 265 has been released.

On an increase in the pressure of the fluid in the brake pipe to a value above that for which the cut-off valve 305 is constructed to respond, the slide valve 318 is returned to the position in which it is shown in the drawings, in which position it cuts off communication between the slide valve chamber 314 and the passage 424, and establishes communication between the passage 424 and the atmospheric passage 426.

On the release of fluid from the passage 424 the fluid in the chamber 327 on the face of the latch piston 325, and in the chamber 348 on the face of the head 346 of the change-over piston device 340, is released to the atmosphere and the latch piston 325 is moved by the spring 329 to the position in which the latch 336 again extends into the path of movement of the projection 452, being located intermediate this projection and the head 342, as shown in the drawings, so as to prevent movement of the change-over piston device to the position to condition the apparatus for loaded car braking.

In addition on the release of fluid from the passage 424 by operation of the cut-off valve device 305 fluid is released from the chamber 378 on the face of the piston 376 of the strut cylinder 262, and the piston 376 is thereupon moved into engagement with the cover of the piston chamber by means of the spring 380. On this movement of the piston 376 communication is established between the passage 448 and the chamber 385 on the spring side of the piston 376, so that fluid under pressure in the chamber 344 on the face of the head 342 may escape to the atmosphere through the passage and pipe 448, the chamber 385 and the passage 386.

On the release of fluid from the passage 424 the check valve 430 operates to prevent back flow of fluid to the passage 424 from the reservoir 270. However, the fluid under pressure in the reservoir 270, in the chamber 289 of the change-over cylinder 258, and in the chamber 392 of the locking device 265 escapes to the atmosphere at a restricted rate through the groove 396 which extends around the piston 390.

As the rate of flow of fluid through the feed groove 396 is restricted the pressure of the fluid in the chamber 392 will not be reduced appreciably until the change-over cylinder 258 has had an opportunity to operate, and thereafter the spring 394 will move the piston 390 to the left, as viewed in Fig. 7 of the drawings, thereby moving the tooth 402 into engagement with the teeth 404 on the stem 290.

If the brakes are applied at the time the fluid pressure is established in the brake pipe and in the valve chamber 314 of the cut-off valve device 305 below that for which the cut-off valve device is constructed to operate, fluid which is supplied to the passage 424 and flows past the check valve 430 to the reservoir 270 will flow through the pipe 418 to the valve device 267, but as the diaphragm 410 will be held in engagement with the seat rib 416 by the fluid under pressure in the chamber 412, fluid will not be permitted to flow past the seat rib 416 and to the change-over cylinder 258 or the locking device 265.

The strut cylinder, the latch piston and the change-over piston however, will operate as described in detail above, while the reservoir 270 will be charged with fluid under pressure.

On the subsequent release of the brakes, the fluid under pressure in the reservoir 270 will flow past the seat rib 416 to the chamber of the change-over cylinder 258, and also to the locking device 265, and the change-over cylinder will be operated to move the fulcrum control means 255 from the position to condition the equipment for loaded car operation to the position to condition the brake equipment for empty car operation.

In Fig. 8 of the drawings there is illustrated another form of brake equipment embodying this invention. This equipment is similar to that shown in Fig. 7 of the drawings, and identical reference numerals are employed on the portions of this equipment which are the same as the portions of the equipment shown in Fig. 7 of the drawings.

This equipment differs from the equipment shown in Fig. 7 of the drawings in that no reservoir is employed to supply the change-over cylinder 258, and this cylinder is supplied with fluid under pressure directly from the brake pipe, while means responsive to the pressure of the fluid in the brake cylinder is employed to cut off the supply of fluid to the change-over cylinder 258 while the brakes are applied, and therefore prevent operation of the change-over cylinder to change the condition of the brake equipment during an application of the brakes.

In the equipment shown in Fig. 8 of the drawings the pipe 316 is connected to the brake pipe and to the valve chamber of the cut-off valve device 305, while a branch pipe 470 is provided and is connected to the valve device 475 on one side of the diaphragm 477 which is subject on the other side to the pressure of the fluid in the chamber 478 which communicates with the brake cylinder by way of the pipe 414.

The valve device 475 has a seat rib 480 formed thereon and the area within the seat rib is connected by way of pipe 432a with a port in the seat of the slide valve of the change-over portion of the change-over control device 260.

In the operation of this equipment fluid under pressure from the brake pipe flows by way of the pipe 316 and the pipe 470 to the valve device 475, and therefrom to the port in the seat of the slide valve of the change-over portion of the control device 260 and the cavity in this slide valve directs the flow to the chamber on the proper side of the piston 285 of the change-over cylinder 258.

When fluid under pressure is supplied to the brake cylinder 250 to effect an application of the brakes, fluid is supplied through the pipe 414 to the chamber 478 and presses the diaphragm 477 against the seat rib 480 so as to cut off the flow of fluid from the brake pipe to the port in the seat of the slide valve of the change-over piston device and thereby cut off the supply of fluid to the change-over cylinder 258. Therefore, if while the brakes are applied, the change-over control mechanism is operated to change from one of its control positions to the other, the change-over cylinder 258 will not be operated until the brakes are released, as the supply of fluid thereto is cut off while the brakes are applied.

As soon as the brakes are released, however, fluid may flow to the proper chamber of the change-over cylinder and it will then operate to change the position of the fulcrum control means in the manner described in detail above.

While several illustrative embodiments of the empty and load brake equipment provided by this invention have been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a fluid pressure brake equipment for a car, in combination, a brake pipe, a brake lever, a brake cylinder operatively connected to the brake lever, a brake applying member operatively connected to said lever at a point spaced from the point of connection of the brake cylinder with said lever, fulcrum control means operative to vary the position of the axis about which the brake lever moves relative to the point of connection of the brake cylinder with said lever, and means responsive to the weight of the material forming the load on the car and to the pressure of the fluid in the brake pipe for operating said fulcrum control means.

2. In a fluid pressure brake equipment for a car, in combination, a brake pipe, a brake lever, a brake cylinder operatively connected to said brake lever, a brake applying member operatively connected to said brake lever at a point spaced from the point of connection of the brake cylinder with said lever, said lever being adapted to move about one axis spaced from the point of connection of the brake cylinder and the brake applying member with said lever or about another axis spaced from the first named axis, and means controlled by the weight of the material forming the load on the car and by the pressure of the fluid in the brake pipe for determining the axis about which said lever moves.

3. In a fluid pressure brake equipment for a car, in combination, a brake pipe, a brake lever, a brake cylinder operatively connected to said brake lever, a brake applying member operatively connected to said brake lever at a point spaced from the point of connection of the brake cylinder with said lever, said lever being adapted to move about one axis spaced from the point of connection of the brake cylinder and the brake applying member with said lever or about another axis spaced from the first named axis, means controlled by the weight of material forming the load on the car and determining the axis about which the lever moves, and means responsive to the pressure of the fluid in the brake pipe and controlling operation of the means controlled by the load on the car.

4. In a fluid pressure brake equipment for a car, in combination, a brake lever, a brake cylinder operatively connected to said brake lever, a brake applying member operatively connected to said brake lever at a point spaced from the point of connection of the brake cylinder with said lever, said lever being adapted to move about one axis spaced from the point of connection of the brake cylinder and the brake applying member with said lever or about another axis spaced from the first named axis, means controlled by the weight of the material forming the load on the car and determining the axis about which said lever moves, and means subject to and operated on a predetermined increase in the pressure of the fluid supplied to the brake cylinder to prevent a change by operation of the means controlled by the load on the car of the axis about which the brake lever moves.

5. In a fluid pressure brake equipment for a car, in combination, a brake lever, a brake cylinder operatively connected to the brake lever, a brake applying member operatively connected to said lever at a point spaced from the point of connection of the brake cylinder with said lever, fulcrum control means operative to vary the position of the axis about which the brake lever moves relative to the point of connection of the brake cylinder with said lever, fluid pressure responsive means for operating said fulcrum control means, a passage through which fluid under pressure may be supplied to said fluid pressure responsive means, and means responsive to the weight of the material forming the load on the car and controlling communication through said passage.

6. In a fluid pressure brake equipment for a car, in combination, a brake pipe, a brake lever, a brake cylinder operatively connected to the brake lever, a brake applying member operatively connected to said lever at a point spaced from the point of connection of the brake cylinder with said lever, fulcrum control means operative to vary the position of the axis about which the brake lever moves relative to the point of connection of the brake cylinder with said lever, fluid pressure responsive means for operating said fulcrum control means, a passage through which fluid under pressure may be supplied to said fluid pressure responsive means, means responsive to the weight of the material forming the load on the car and controlling communication through said passage, and means subject to the pressure of the fluid in the brake pipe and also controlling communication through said passage.

7. In a fluid pressure brake equipment for a car, in combination, a brake pipe, a brake lever, a brake cylinder operatively connected to the brake lever, a brake applying member operatively connected to said lever at a point spaced from the point of connection of the brake cylinder with said lever, fulcrum control means operative to vary the position of the axis about which the brake lever moves relative to the point of connection of the brake cylinder with said lever, fluid pressure responsive means operated on an increase in the pressure of the fluid supplied thereto to operate the fulcrum control means to effect a given variation in the position of the axis about which the brake lever is moved, and means subject to and operated upon a reduction in the pressure of the fluid in the brake pipe to a predetermined value to supply fluid to a passage through which fluid may be supplied to said fluid pressure responsive means and being operated upon an increase in the pressure of the fluid in the brake pipe above said predetermined value to cut off the supply of fluid to said passage and to release fluid from said passage.

8. In a fluid pressure brake equipment for a car, in combination, a brake pipe, a brake lever, a brake cylinder operatively connected to the brake lever, a brake applying member operatively connected to said lever at a point spaced from the point of connection of the brake cylinder with said lever, fulcrum control means operative to vary the position of the axis about which the brake lever moves relative to the point of connection of the brake cylinder with said lever, fluid pressure responsive means operated on an increase in the pressure of the fluid supplied thereto to operate the fulcrum control means to effect a given variation in the position of the axis about which the brake lever moves, means subject to and operated upon a predetermined reduction in the pressure of the fluid in the brake pipe to supply fluid under pressure to a passage through which fluid may be supplied to the fluid pressure responsive means, and means controlled by the weight of the material forming the load on the car and controlling communication through said passage.

9. In a fluid pressure brake equipment for a car, in combination, a brake lever, a brake cylinder operatively connected to the brake lever, a brake applying member operatively connected to said lever at a point spaced from the point of connection of the brake cylinder with said lever, fulcrum control means operative to vary the position of the axis about which the brake lever moves relative to the point of connection of the brake cylinder with said lever, fluid pressure responsive means for operating said fulcrum control means, a passage through which fluid under pressure may be supplied to said fluid pressure responsive means, latch means associated with said fluid pressure responsive means and operative to prevent operation of said fluid pressure responsive means, means yieldingly urging said latch means to a position to prevent operation of the fluid pressure responsive means, means subject to and operated upon a reduction in the pressure of the fluid in the brake pipe to a predetermined value to supply fluid under pressure to said passage, and means subject to and operated upon an increase in the pressure of the fluid supplied to said passage to move said latch means to a position to permit said fluid pressure responsive means to operate.

10. In a fluid pressure brake equipment for a car, in combination, a brake lever, a brake cylinder operatively connected to the brake lever, a brake applying member operatively connected to the brake lever at a point spaced from the point of connection of the brake cylinder with said lever, fulcrum control means operative in one position to condition the equipment to cause the brake lever to move about one axis spaced from the point of connection of the brake cylinder with said brake lever and operative in another position to condition the equipment to cause the brake lever to move about another axis spaced from the first named axis, a first movable abutment subject to the pressure of the fluid in a chamber, a second movable abutment subject to the pressure of the fluid in another chamber, means subject to the opposing forces of said abutments and determining the position of the fulcrum control means, and means responsive to the weight of the material forming the load on the car and controlling the supply of fluid under pressure to one of said chambers.

11. In a fluid pressure brake equipment for a car, in combination, a brake lever, a brake cylinder operatively connected to the brake lever, a brake applying member operatively connected to the brake lever at a point spaced from the point of connection of the brake cylinder with said lever, fulcrum control means operative in one position to condition the equipment to cause the brake lever to move about one axis spaced from the point of connection of the brake cylinder with said brake lever and operative in another position to condition the equipment to cause the brake lever to move about another axis spaced from the first named axis, a first movable abutment subject to the pressure of the fluid in a chamber, a second movable abutment subject to the pressure of the fluid in another chamber, means subject to the opposing forces of said abutments and determining the position of the fulcrum control means, the first movable abutment being operative on an increase in the pressure of the fluid supplied to the chamber associated therewith and on a reduction to a predetermined value in the pressure of the fluid in said other chamber to effect movement of the fulcrum control means to one position, the second movable abutment being operative on an increase in the pressure of the fluid supplied to the chamber associated therewith to effect movement of the fulcrum control means to the other position, and means responsive to the weight of the material forming the load on the car and controlling the supply of fluid under pressure to said other chamber.

12. In a fluid pressure brake equipment for a car, in combination, a brake pipe, a brake lever, a brake cylinder operatively connected to the brake lever, a brake applying member operatively connected to the brake lever at a point spaced from the point of connection of the brake cylinder with said lever, fulcrum control means operative in one position to condition the equipment to cause the brake lever to move about one axis spaced from the point of connection of the brake cylinder with said brake lever and operative in another position to condition the equipment to cause the brake lever to move about another axis spaced from the first named axis, a first movable abutment subject to the pressure of the fluid in a chamber, a second movable abutment subject to the pressure of the fluid in another chamber, means subject to the opposing forces of said abutments and determining the position of the fulcrum control means, means subject to and operated on a reduction in the pressure of the fluid in the brake pipe to a predetermined value to supply fluid under pressure to a passage through which fluid under pressure may be supplied to said chambers, and means responsive to the weight of the material forming the load on the car and controlling the supply of fluid under pressure from said passage to one of said chambers.

13. In a fluid pressure brake equipment for a car, in combination, a brake lever, a brake cylinder operatively connected to the brake lever, a brake applying member operatively connected to the brake lever at a point spaced from the point of connection of the brake cylinder with said lever, fulcrum control means operative in one position to condition the equipment to cause the brake lever to move about one axis spaced from the point of connection of the brake cylinder with said brake lever and operative in another position to condition the equipment to cause the brake lever to move about another axis spaced from the first named axis, movable abutment means subject to the opposing pressures of the fluid in chambers on opposite sides thereof for moving said fulcrum control means, a source of fluid under pressure, means responsive to the weight of the material forming the load on the car and operative to selectively control the supply of fluid from said source to the chambers associated with the movable abutment means and to control the release of fluid from said chambers, and means subject to and operated on an increase in the pressure of the fluid in the brake cylinder to close the communication through which fluid is supplied from said source.

14. In a fluid pressure brake equipment for a car, in combination, a brake lever, a brake cylinder operatively connected to the brake lever, a brake applying member operatively connected to the brake lever at a point spaced from the point of connection of the brake cylinder with said lever, fulcrum control means operative in one position to condition the equipment to cause the brake lever to move about one axis spaced from the point of connection of the brake cylinder with said brake lever and operative in another position to condition the equipment to cause the brake lever to move about another axis spaced from the first named axis, movable abutment means subject to the opposing pressures of the fluid in chambers on opposite sides thereof for moving said fulcrum control means, a source of fluid under pressure, means responsive to the weight of the material forming the load on the car and operative to selectively control the supply of fluid under pressure from said source to said chambers and to control the release of fluid from said chambers, latch means associated with the movable abutment means and normally operative to prevent operation of said movable abutment means, and means subject to and operated on a predetermined increase in the pressure of the fluid supplied to either of said chambers to render said latch means ineffective to prevent operation of the movable abutment means.

15. In a fluid pressure brake equipment for a car, in combination, a brake pipe, a brake lever, a brake cylinder operatively connected to the brake lever, a brake applying member operatively connected to the brake lever at a point spaced from the point of connection of the brake cylinder with said brake lever, fulcrum control means operative in one position to condition the equipment to cause the brake lever to move about one axis spaced from the point of connection of the brake cylinder with said lever, and operative in another position to condition the equipment to cause the brake lever to move about an axis spaced from the first named axis, a first movable abutment subject to the pressure of the fluid in a chamber, a second movable abutment subject to the pressure of the fluid in another chamber, means subject to the opposing forces of said abutments and determining the position of the said fulcrum control means, means subject to and operated on a reduction in the pressure of the fluid in the brake pipe to a predetermined value to supply fluid under pressure to a passage through which fluid may be supplied to said chambers, means subject to and operated on an increase in the pressure of the fluid in said passage to a given value to open communication from said passage to one of said chambers, means responsive to the weight of the material forming the load on the car and controlling communication between said passage and the other of said chambers, and means normally closing communication between said passage and said other chamber, said means being subject to and operated on an increase in the pressure of the fluid in said passage to a value lower than said given value to establish communication between said passage and said other chamber.

16. In a fluid pressure brake equipment for a car, in combination, a brake lever, a brake cylinder operatively connected to said brake lever, a brake applying member operatively connected to said brake lever at a point spaced from the point of connection of the brake cylinder with said brake lever, the brake lever having a pair of pins associated therewith, said pins being spaced apart and being positioned at points spaced from the point of connection of the brake cylinder and the brake applying member with said brake lever, a fulcrum controlling member movable between spaced positions and having means associated therewith and operative when said member is in one of said positions to engage one of said pins so as to cause the brake lever to move about an axis determined by said pin, said fulcrum control member being operative when in the other of said positions to engage the other of said pins so as to cause the brake lever to move about an axis determined by said other pin, and means responsive to the weight of the material forming the load on the car for moving said fulcrum controlling member between said spaced positions.

17. In a fluid pressure brake, in combination, a fulcrumed brake lever, a brake cylinder operatively connected to said lever, mechanism movable to shift the fulcrum point of said lever to vary the lever ratio of said lever, and locking means operated by fluid under pressure supplied to the brake cylinder for locking said mechanism against movement.

18. In a fluid pressure brake equipment for a car, in combination, a brake lever, a brake cylinder operatively connected to said brake lever, a brake applying member operatively connected to said brake lever at a point spaced from the point of connection of the brake cylinder with said brake lever, a fulcrum controlling member operative in one position to establish a substantially fixed pivotal connection between the brake lever and the car structure about which the brake lever may move and operative in another position to disestablish said pivotal connection, means establishing a sliding connection between the car structure and a point on the brake lever on the side of the pivotal connection between the brake lever and the car structure controlled by the fulcrum controlling means remote from the point of connection between the brake cylinder and said lever, said sliding connection being adapted to permit said portion of the brake lever to be moved by the brake cylinder when the fulcrum control member is in the position to establish pivotal connection between the brake lever and the car structure, and being operative to prevent movement of the said portion of the brake lever by the brake cylinder when said fulcrum control member is in the position to disestablish the pivotal connection between the brake lever and the car structure, and means responsive to the weight of the material forming the load on the car and determining the position of the fulcrum control member.

19. In a fluid pressure brake equipment for a car, in combination, a brake pipe, a brake lever, a brake cylinder operatively connected to the brake lever, a brake applying member operatively connected to said lever at a point spaced from the point of connection of the brake cylinder with said lever, mechanism movable to shift the fulcrum point of said lever to vary the lever ratio of the said lever, means responsive to the weight of the material forming the load on the car for moving said mechanism, means responsive to the pressure of the fluid in the brake pipe for controlling operation of the load responsive means, and locking means operated by fluid under pressure supplied to the brake cylinder for locking said mechanism against movement.

20. In a fluid pressure brake equipment for a car, in combination, a brake pipe, a brake lever, a brake cylinder operatively connected to the brake lever, a brake applying member operatively connected to said lever at a point spaced from the point of connection of the brake cylinder with said lever, mechanism movable to shift the fulcrum point of said lever to vary the lever ratio of said lever, means responsive to the pressure of the fluid in the brake pipe for controlling movement of said mechanism, and locking means operated by fluid under pressure supplied to the brake cylinder for locking said mechanism against movement.

21. In a fluid pressure brake equipment, in combination, a brake pipe, a brake lever, a brake cylinder operatively connected to the brake lever, a brake applying member operatively connected to said lever at a point spaced from the point of connection of the brake cylinder with said lever, mechanism movable to shift the fulcrum point of said lever to vary the lever ratio of the lever, movable abutment means operated by variations in the pressure of the fluid supplied thereto for moving said mechanism, valve means responsive to the pressure of the fluid in the brake pipe for supplying fluid under pressure to said abutment means, and means responsive to the pressure of the fluid supplied to the brake cylinder and controlling the supply of fluid under pressure to said abutment means.

22. In a fluid pressure brake equipment, in combination, a brake pipe, a brake lever, a brake cylinder operatively connected to the brake lever, a brake applying member operatively connected to said lever at a point spaced from the point of connection of the brake cylinder with said lever, mechanism movable to shift the fulcrum point of said lever to vary the lever ratio of the lever, movable abutment means operated by variations in the pressure of the fluid supplied thereto for moving said mechanism, valve means responsive to the weight of the material forming the load on the car for controlling the supply of fluid under pressure to said abutment means, and means responsive to the pressure of the fluid supplied to the brake cylinder and controlling the supply of fluid under pressure by said valve means to said abutment means.

23. In an empty and load fluid pressure brake equipment for a vehicle, in combination, mechanism movable between spaced positions and operative in one of said positions to condition the equipment to produce one degree of braking effect and operative in the other of said positions to condition the brake equipment to produce a different degree of braking effect, a brake cylinder, means responsive to the weight of the material forming the load on the vehicle for controlling the position of said mechanism, and locking means operated by fluid under pressure supplied to the brake cylinder for locking said mechanism against movement.

24. In an empty and load fluid pressure brake equipment for a vehicle, in combination, mechanism movable between spaced positions and operative in one of said positions to condition the equipment to produce one degree of braking effect and operative in the other of said positions to condition the equipment to produce a different degree of braking effect, movable abutment means responsive to variations in the pressure of the fluid supplied thereto for moving said mechanism, means responsive to the weight of the material forming the load on the vehicle for controlling the supply of fluid under pressure to said abutment means, a brake cylinder, and locking means operated by fluid under pressure supplied to the brake cylinder for locking said mechanism against movement.

25. In an empty and load fluid pressure brake equipment for a vehicle, in combination, mechanism movable between spaced positions and operative in one of said positions to condition the equipment to produce one degree of braking effect and operative in the other of said positions to condition the equipment to produce a different degree of braking effect, movable abutment means responsive to variations in the pressure of the fluid supplied thereto for moving said mechanism, means responsive to the weight of material forming the load on the vehicle for supplying fluid under pressure to said abutment means, and means responsive to the pressure of the fluid supplied to the brake cylinder and controlling the supply of fluid under pressure to said abutment means by said load responsive means.

26. In an empty and load fluid pressure brake equipment for a vehicle, in combination, a brake pipe, a brake cylinder, mechanism movable between spaced positions and operative in one of said positions to condition the equipment to produce one degree of braking effect and operative in the other of said positions to condition the equipment to produce a different degree of braking effect, movable abutment means responsive to variations in the pressure of the fluid supplied thereto for moving said mechanism, valve means responsive to the pressure of the fluid in the brake pipe for supplying fluid under pressure to a passage through which fluid under pressure may be supplied to the abutment means, a valve device controlled by the weight of the material forming the load on the vehicle for controlling the supply of fluid under pressure from said passage to said abutment means, and locking means operated by fluid under pressure supplied to the brake cylinder for locking said mechanism against movement.

27. In an empty and load fluid pressure brake equipment for a vehicle, a combination, a brake pipe, a brake cylinder, mechanism movable between spaced positions and operative in one of said positions to condition the equipment to produce one degree of braking effect and operative in the other of said positions to condition the equipment to produce a different degree of braking effect, movable abutment means responsive to variations in the pressure of the fluid supplied thereto for moving said mechanism, valve means controlled by the weight of the material forming the load on the vehicle and by the pressure of the fluid in the brake pipe and controlling a communication through which fluid under pressure may be supplied from a source to said abutment means, and means responsive to the pressure of the fluid supplied to the brake cylinder and controlling the supply of fluid under pressure from said source to said valve means.

28. In an empty and load fluid pressure brake equipment for a vehicle, in combination, a brake pipe, a brake cylinder, mechanism movable between spaced positions and operative in one of said positions to condition the equipment to produce one degree of braking effect and operative in the other of said positions to condition the equipment to produce a different degree of braking effect, movable abutment means responsive to variations in the pressure of the fluid supplied thereto for moving said mechanism, valve means controlled by the weight of the material forming the load on the vehicle and by the pressure of the fluid in the brake pipe and controlling a passage through which fluid under pressure may be supplied from a source to said abutment means, and means responsive to the pressure of the fluid supplied to the brake cylinder and controlling communication through said passage.

29. In an empty and load fluid pressure brake equipment for a vehicle, in combination, a brake pipe, a brake lever, a brake cylinder operatively connected to the brake lever, a brake applying member operatively connected to said lever at a point spaced from the point of connection of the brake cylinder with said lever, mechanism movable to vary the lever ratio of said brake lever, and means responsive to variations in the load on the vehicle and to the pressure of the fluid in the brake pipe for operating said mechanism.

30. In an empty and load fluid pressure brake equipment for a vehicle, in combination, a brake pipe, a brake lever, a brake cylinder operatively connected to the brake lever, a brake applying member operatively connected to said lever at a point spaced from the point of connection of the brake cylinder with said lever, mechanism movable to vary the lever ratio of said brake lever, a movable abutment subject to the pressure of the fluid in a chamber for moving said mechanism, and means responsive to the weight of the material forming the load on the vehicle and to the pressure of the fluid in the brake pipe for controlling the supply of fluid under pressure to said chamber.

31. In combination with a railway car brake rigging and a fluid pressure system for operating the brake rigging, fluid pressure operated means for varying the leverage ratio of the brake rigging according to the light or loaded condition of thhe car, and mechanism for controlling the operation of said means, said mechanism including a device subject to the fluid pressure of the brake system and movable thereby according to the light or loaded condition of the car.

32. In combination with a railway car brake rigging and a fluid pressure system for operating the brake rigging, fluid pressure operated means for varying the leverage ratio of the brake rigging according to the light and loaded condition of the car, and mechanism for controlling the operation of said means, said mechanism including a device subject to the fluid pressure and movable thereby to determine the light or loaded condititon of the car, and valve means responsive to the fluid pressure and operable upon a predetermined increase in said pressure to shut off the flow of fluid to said device whereby the latter is rendered free to return to an inoperative position.

33. In combination with a railway car brake rigging and a system for operating the brake rigging, fluid pressure operated means for varying the leverage ratio of the brake rigging according to the light or loaded condition of the car, and mechanism for controlling the operation of said means, said mechanism including a device normally disposed in inoperative position and adapted to be subjected to the fluid pressure of the brake system for movement thereby to determine the light or loaded condition of the car, valve means responsive to the said fluid pressure for controlling the movement of said device, said valve means being operative to permit the flow of fluid to said device when said pressure is below a predetermined amount and being operative to prevent the flow of fluid to said device when the pressure exceeds said predetermined amount, and means for normally maintaining said device in inoperative position.

ELLIS E. HEWITT.